United States Patent
Snyder et al.

(10) Patent No.: US 12,146,071 B2
(45) Date of Patent: Nov. 19, 2024

(54) SURFACE TREATMENT

(71) Applicant: INTERPHASE MATERIALS INC., Pittsburgh, PA (US)

(72) Inventors: Noah Snyder, Glenshaw, PA (US); Kasey Catt, Pittsburgh, PA (US); Natasha Gorski, Pittsburgh, PA (US)

(73) Assignee: Interphase Materials Inc., Pittsburgh, PA (US)

( * ) Notice: Subject to any disclaimer, the term of this patent is extended or adjusted under 35 U.S.C. 154(b) by 0 days.

(21) Appl. No.: 16/639,169

(22) PCT Filed: Aug. 14, 2018

(86) PCT No.: PCT/US2018/046730
§ 371 (c)(1),
(2) Date: Feb. 14, 2020

(87) PCT Pub. No.: WO2019/164546
PCT Pub. Date: Aug. 29, 2019

(65) Prior Publication Data
US 2020/0231842 A1    Jul. 23, 2020

Related U.S. Application Data

(60) Provisional application No. 62/545,438, filed on Aug. 14, 2017.

(51) Int. Cl.
*C09D 183/06* (2006.01)
*B05D 7/22* (2006.01)
(Continued)

(52) U.S. Cl.
CPC .......... *C09D 183/06* (2013.01); *B05D 7/225* (2013.01); *C08G 77/14* (2013.01); *C08G 77/24* (2013.01);
(Continued)

(58) Field of Classification Search
None
See application file for complete search history.

(56) References Cited

U.S. PATENT DOCUMENTS 3,775,360 A    11/1973  Smith
5,185,191 A    2/1993   Silberman et al.
(Continued)

FOREIGN PATENT DOCUMENTS

EP    1076208 A1 *  2/2001  ............... F23J 13/02
JP    H11282160 A   10/1999
(Continued)

OTHER PUBLICATIONS

English Machine Translation EP1076208 (2001).*
(Continued)

*Primary Examiner* — Ramsey Zacharia
(74) *Attorney, Agent, or Firm* — Zachary M. Thomas

(57) ABSTRACT

A surface treatment includes a functional component and a linking component, wherein the linking component is capable of hydrogen bonding and/or covalently linking with the functional component and is capable of hydrogen bonding and/or covalently linking with the surface to form a treated surface. The surface treatment provides a beneficial property to the surface when the surface treatment is bonded to the surface.

8 Claims, 16 Drawing Sheets

(51) Int. Cl.
- *C08G 77/14* (2006.01)
- *C08G 77/24* (2006.01)
- *C08G 77/26* (2006.01)
- *C09D 183/08* (2006.01)

(52) U.S. Cl.
CPC ........... *C08G 77/26* (2013.01); *C09D 183/08* (2013.01); *B05D 2202/15* (2013.01); *B05D 2202/45* (2013.01); *B05D 2518/10* (2013.01)

(56) References Cited

U.S. PATENT DOCUMENTS

| | | | |
|---|---|---|---|
| 6,284,682 B1 * | 9/2001 | Troczynski | C23C 18/1208 501/12 |
| 9,616,459 B1 | 4/2017 | Lohmeier et al. | |
| 2004/0231809 A1 | 11/2004 | Wheatley | |
| 2008/0268062 A1 | 10/2008 | Baran, Jr. et al. | |
| 2010/0267982 A1 | 10/2010 | Kim et al. | |
| 2013/0203883 A1 | 8/2013 | Minagawa | |
| 2016/0102406 A1 | 4/2016 | Esteban et al. | |
| 2017/0050996 A1 | 2/2017 | Cui et al. | |

FOREIGN PATENT DOCUMENTS

| | | | | |
|---|---|---|---|---|
| JP | 2000248398 A | * | 9/2000 | |
| JP | 2003001746 A | * | 1/2003 | ............. F28F 13/18 |
| JP | 2013224436 A | * | 10/2013 | |
| WO | 2006032512 A2 | | 3/2006 | |
| WO | 2006112932 A2 | | 10/2006 | |
| WO | 2014066674 A1 | | 5/2014 | |
| WO | 2014167388 A1 | | 10/2014 | |
| WO | 2016025004 A1 | | 2/2016 | |
| WO | WO-2016153230 A1 | * | 9/2016 | ............. G06F 3/041 |

OTHER PUBLICATIONS

English machine translation of JP2013224436 (2013).*
English manchine translation of WO2016153230 (2016).*
English machine translation of JP2003001746 (2003).*
English machine translation of JP2000248398A (2000).*
International Search Report dated Oct. 7, 2019 for International Patent Application No. PCT/US2018/046730, 5 pages.
Written Opinion dated Oct. 7, 2019 for International Patent Application No. PCT/US2018/046730, 14 pages.
(Kim, H-Y et al.) Effects of hydrophilic surface treatment on evaporation heat transfer at the outside wall of horizontal tubes. Applied Thermal Engineering, Vot. 23, No. 4, pp. 449-558, Mar. 1, 2003; abstract; p. 453, top; p. 454, figure 3b.
(Hock, VF et al.) Development and Testing of an Anti-Scale/Corrosion Resistant Coating for Domestic Hot Water Heat Exchangers. Construction Engineering Research Laboratory, US Army Corps of Engineers, Dec. 1990; abstract; p. 7, first paragraph; p. 18, second paragraph; p. 28, second-fifth paragraphs.
Extended European Search Report for Application No. 18907376.0; dated Jul. 23, 2021; 11 pages.

* cited by examiner

Coupon with water pretreatment but no coating

Coupons with water pretreatment and coating described above (performed at separate times)

SURFACE TREATMENT

CROSS REFERENCE TO RELATED APPLICATIONS

This application is a U.S. National Stage Entry of International Patent Application PCT/US2018/046730, filed Aug. 14, 2018, claims the benefit of U.S. Provisional Patent Application No. 62/545,438, filed on Aug. 14, 2017 and entitled "Surface Treatment," which are incorporated by reference herein in their entireties.

STATEMENT OF GOVERNMENT INTEREST

This invention was made with government support under Contract No. N161-041-0110 awarded by the Naval Sea Systems Command (NAVSEA). The government has certain rights in the invention.

FIELD OF THE INVENTION

The present invention generally relates to surface treatments and the use thereof. More particularly, the present invention relates to surface treatments that can be used on a substrate to improve the heat transfer properties of the substrate and/or inhibit the adhesion and/or accumulation of organisms, as well as inhibit deposition of inorganic scale on the substrate and corrosion of the substrate (e.g., in a heat exchanger).

BACKGROUND OF THE INVENTION

Heat exchanger cooling loops are implemented in a variety of industries to dissipate heat from critical components and utilize the transfer of heat from one media to another. These systems, for example power plant condensers, evaporators, and HVAC chillers, often dissipate large amounts of heat through transfer to water and consequent evaporative cooling or simple expulsion of the heated water to a large body of water. Because of the large volumes of water required to cool these systems, often the water is drawn in from untreated sources such as rivers, lakes, and oceans. These waters often contain a wide variety of organisms and diverse chemistry resulting in the need to treat the water prior to exposure to the heat exchanger cooling loop. Lack of proper water treatment can result in organism growth (biofouling) in the tubes, excessive deposition of inorganic scale, and accelerated corrosion, all of which dramatically impact day to day efficiency of the systems as well as long term maintenance costs. Treatment of these large volumes of water to combat organism growth and adverse water chemistry are costly, not always effective, vary largely by location, and require diligent oversight. To decrease the burden of water treatment regimes there is a need for a surface treatment that can be applied to these cooling systems that simultaneously inhibits inorganic scaling, biofouling, and corrosion while preserving or enhancing heat transfer characteristics.

BRIEF SUMMARY OF THE INVENTION

In some embodiments a surface treatment includes a functional component and a linking component, wherein the linking component is capable of hydrogen bonding and/or covalently linking with the functional component and is capable of hydrogen bonding and/or covalently linking with a surface of a substrate to form a treated surface, and wherein the surface treatment provides a beneficial property to the surface when the surface treatment is bonded to the surface. In some embodiments the linking component has a structure of A-R—B, wherein A is capable of hydrogen bonding and/or covalently linking with the functional component, R is a branched or unbranched hydrocarbon, alkoxy, amine, or ether chain, and B is capable of hydrogen bonding and/or covalently linking with a surface of the substrate to form a treated surface, and wherein the surface treatment provides a beneficial property to the surface when the surface treatment is bonded to the surface.

In some embodiments a surface treatment is derived from a functional component and a linking component, wherein the linking component has a structure of A-R—B, wherein A is capable of hydrogen bonding and/or covalently linking with the functional component, R is a branched or unbranched hydrocarbon, alkoxy, amine, or ether chain, and B is capable of hydrogen bonding and/or covalently linking with a surface of the substrate to form a treated surface, wherein the functional component and the linking component are hydrogen bonded and/or covalently linked, and wherein the surface treatment provides a beneficial property to the surface when the surface treatment is bonded to the surface. The surface treatment may provide a beneficial property that is one or more of: inhibition of bio-fouling, inhibition of corrosion, lowered surface energy, increased hydrophobicity, inhibition of scaling, increased heat transfer, inhibition of fouling without loss to heat transfer, and maintenance of optimal heat transfer performance.

In some embodiments a surface treatment has a structure of X—R—B, wherein X is a halogen or halogenated component, R is a branched or unbranched hydrocarbon, alkoxy, amine, or ether chain, and B is capable of hydrogen bonding and/or covalently linking with a surface of a substrate to form a treated surface, wherein the surface treatment provides a beneficial property to the surface when the surface treatment is bonded to the surface.

In some embodiments a treated surface is derived from a substrate and a surface treatment, wherein the substrate has a surface, wherein the surface treatment is derived from a functional component and a linking component, wherein the linking component has a structure of A-R—B, wherein A is capable of hydrogen bonding and/or covalently linking with the functional component, R is a branched or unbranched hydrocarbon, alkoxy, amine, or ether chain, and B is capable of hydrogen bonding and/or covalently linking with the surface to form a treated surface, wherein the functional component and the linking component are hydrogen bonded and/or covalently linked, wherein the linking component and surface of the substrate are linked (e.g., hydrogen bonded or covalently bonded), and wherein the surface treatment provides a beneficial property to the surface when the surface treatment is bonded to the surface. In some embodiments the beneficial property is one or more of: increased foul resistance, increased foul release, inhibition of corrosion, lowered surface energy, increased hydrophobicity, inhibition of scaling, increased heat transfer, inhibition of fouling without loss to heat transfer, and maintenance of heat transfer.

In some embodiments the functional component of a surface treatment or treated surface is halogenated. In some embodiments the functional component of a surface treatment or treated surface is selected from 2,2-Difluoroethylamine, 2,2,2-Trifluoroethylamine, 2,2,2-Trifluoroethylamine hydrochloride, 2,2-difluoroethylamine hydrochloride, 3,3,3-trifluoropropylamine, 4-(Trifluoromethyl)aniline hydrochloride, 2,2,3,3,4,4,4-Heptafluorobutylamine, 2,2,3, 3,3-pentafluoropropylamine, 3-fluoro-6-hydroxybenzyl amine, 5-Fluoro-1,3-thiazol-2-amine, 5-Fluoro-4-methyl-1,3-thiazol-2-amine, [(5-Fluoro-1H-benzimidazol-2-yl)methyl]amine dihydrochloride, 4-Chloro-6-fluoro-1,3-benzothiazol-2-amine, 3-Fluoro-5-(trifluoromethyl)benzylamine, 4-(Trifluoromethyl)aniline hydrochloride, 2,6-Dichloro-4-(trifluoromethyl)aniline, 4-(Trifluoromethyl)benzylamine, 3-(Trifluoromethyl)aniline, 1H,1H-Perfluorooctylamine, 4,4,5,5,6,6,7,7,8,8,9,9,10,10,11,11,11-Heptadecafluoroundecylamine, 3,3,3-Trifluoro-1-propanamine hydrochloride, 3-Fluoro-propylamine hydrochloride, 2-Fluoroethylamine hydrochloride, Trifluoroacetic acid, Perfluorooctanoic acid, Perfluorodecanoic acid, 1,1,1,3,3,3-Hexafluoro-2-propanol, 2,2,2-Trifluoroethanol, Nonafluoro-tert-butyl alcohol, 1,1,1,3,3,3-Hexafluoro-2-methyl-2-propanol, 2,2,3,3,4,4,4-Heptafluoro-1-butanol, 1H,1H,2H,2H-Perfluorohexan-1-ol, 2-Trifluoromethyl-2-propanol, 1,1,1-Trifluoro-2-propanol, and octadecylamine. In some embodiments the functional component of a surface treatment or treated surface comprises an amine group, a hydroxyl group, an organochloride, and/or a carboxylic acid group. In some embodiments the surface treatment further includes at least a second functional component.

In some embodiments the substrate of a surface treatment or treated surface comprises a metal, for example zinc, tin, lead, molybdenum, iron, copper, nickel, aluminum, chromium, titanium, steel, or a combination thereof. In some embodiments the substrate comprises glass, ceramic, or fiberglass or a combination thereof. In some embodiments the substrate comprises a plastic, for example polyvinylchloride, polyethylene, or polyoxymethylene or a combination thereof.

In some embodiments the substrate comprises a coating that, in some embodiments, comprises one or more of epoxy, polyurethane, and acrylic or a combination thereof.

In some embodiments the substrate is a component in a heat exchanger, a condenser, an evaporator, or a cooling tower. In some embodiments the substrate forms a fluid conduit in the heat exchanger, a condenser, an evaporator, or a cooling tower and the surface of the substrate is an internal surface of the fluid conduit.

In some embodiments A of the linking component of a surface treatment or treated surface comprises isocyanate. In some embodiments A of the linking component of a surface treatment or treated surface comprises an epoxide. In some embodiments A of the linking component of a surface treatment or treated surface comprises an acrylate. In some embodiments A of the linking component of a surface treatment or treated surface comprises a vinyl. In some embodiments A of the linking component of a surface treatment or treated surface comprises one or more of an isocyanate, an epoxide, an acrylate, and a vinyl. In some embodiments B of the linking component of a surface treatment or treated surface comprises a silyl. In some embodiments the silyl may be functionalized, for example a mono-, di-, or tri-functionalized alkoxy silyl. In some embodiments the silyl is an alkoxy silyl. In some embodiments R of the linking component of a surface treatment or treated surface has a length of 1-24 atoms. In some embodiments one or more of the atoms of R is substituted with O, N, or S. In some embodiments a surface treatment or treated surface further includes at least a second linking component.

In some embodiments the surface treatment comprises an ordered assembly of molecules. In some embodiments the ordered assembly of molecules comprises a monolayer. In some embodiments the monolayer is a self-assembled monolayer.

In some embodiments the surface treatment is hydrophobic. In some embodiments the surface treatment has a contact angle of a droplet of water on the treated surface of greater than 90°. In some embodiments the treated surface is more hydrophobic than the substrate. In some embodiments the treated surface has a heat transfer coefficient within about ±20%, about ±10%, about ±5%, about ±3%, about ±1%, about ±0.5%, or about ±0.1% of the heat transfer coefficient of the substrate. In some embodiments the treated surface improves the heat transfer coefficient of the substrate by about 0.1%, about 0.5%, about 1%, about 3%, about 5%, about 10%, or about 20%.

In some embodiments of treated surfaces according to the invention the treated surface is more hydrophobic than the substrate. In some embodiments the treated surface corrodes at a slower rate than the substrate. In some embodiments the treated surface resists scaling compared to the substrate. In some embodiments the treated surface resists accumulation of organisms compared to the substrate. In some embodiments the surface treatment covers at least 10% of the surface. In some embodiments the surface treatment maintains the heat transfer coefficient for one week (or at least one week), for two weeks (or at least two weeks), for four weeks (or at least four weeks), a month (or at least one month), or a year (or at least one year) under exposure to water.

In an embodiment a method of applying a surface treatment to at least a portion of a surface of a substrate wherein the surface treatment comprises a functional component and a linking component, includes combining the functional component and the linking component to form a surface treatment material; and applying the surface treatment to the surface to form a treated surface.

In an embodiment a method of improving the performance of a substrate, wherein performance is one or more of inhibition of bio-fouling, inhibition of corrosion, lowered surface energy, increased hydrophobicity, inhibition of scaling, increased heat transfer, inhibition of fouling without loss to heat transfer, and maintenance of heat transfer includes combining the functional component and the linking component to form a surface treatment material; and applying the surface treatment to the surface to form a treated surface.

In an embodiment a method of improving the performance of a substrate, wherein performance is one or more of increased foul resistance, inhibition of corrosion, lowered surface energy, increased hydrophobicity, inhibition of scaling, increased heat transfer, inhibition of fouling without loss to heat transfer, and maintenance of heat transfer includes a) combining the surface treatment with a solvent to form a surface treatment solution; and b) applying the surface treatment solution to the surface to form a treated surface, wherein the surface treatment has a structure of X—R—B, wherein X is a halogen or halogenated component, R is a branched or unbranched hydrocarbon, alkoxy, amine, or ether chain, and B is capable of hydrogen bonding and/or covalently linking with a surface of a substrate to form a treated surface.

In some embodiments of a method, the functional component is provided in solvent. In some embodiments the linking component is provided in solvent. In some embodiments the solvent is water, while in other embodiments the solvent is an organic solvent, or a combination thereof.

In some embodiments a method further includes adding a solvent to the surface treatment before applying the surface treatment to the surface. In some embodiments a method further includes applying a solvent to the substrate to clean the substrate before applying the diluted solution to the substrate. In some embodiments a method further includes combining the functional component and the linking component with water. In some embodiments a method further includes combining the functional component, the linking component, and the water with acid. In some embodiments a method further includes drying the treated surface.

In some embodiments of a method, the linking component is present in an amount of 0.001% to 10% (w/v) of the solvent. In some embodiments the functional component and linking are in a molar ratio of 1:10 to 10:1.

In some embodiments of a method, applying the surface treatment to the surface includes flowing the surface treatment through an apparatus comprising the surface, wherein the surface defines a conduit through which the surface treatment is flowed. In some embodiments the apparatus is a heat exchanger, a condenser, an evaporator, or a cooling tower.

BRIEF DESCRIPTION OF THE SEVERAL VIEWS OF THE DRAWINGS

The foregoing summary, as well as the following detailed description of embodiments of the surface treatment, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

Figure 1:
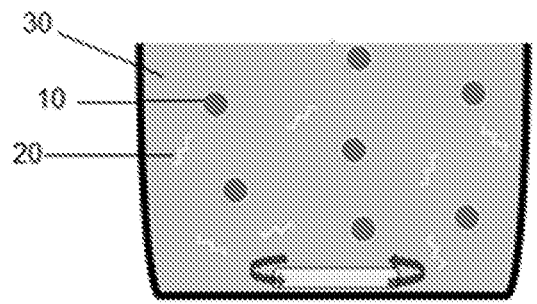
FIG. 1 is a schematic of a step of a method of preparing a surface treatment according to an embodiment of the invention.

Disclosed herein are novel surface treatments comprising a functional component and a linking component. In some embodiments the surface treatments can be used to impart beneficial properties such as improved deterrence of attachment of organic and/or inorganic fouling, anti-corrosive, anti-scaling, lowered surface energy, enhanced hydrophobicity, inhibition of fouling without loss to heat transfer, maintenance of optimal heat transfer performance and/or other beneficial properties to a surface. In some embodiments the surface treatments can be used to impart beneficial properties without reducing the heat transfer capability of the surface, or in addition to enhancing the heat transfer capability of the surface.

I. Surface Treatments

Disclosed herein are novel surface treatments. A surface treatment may provide beneficial properties to a substrate. For example, surface treatments can have foul resistant and/or foul release properties wherein the surface treatment reduces the growth of biological contaminants. Surface treatments can also have anti-corrosion properties, wherein they reduce the rate of oxidation of the underlying substrate. In some embodiments surface treatments have anti-scaling properties, wherein they inhibit and/or reduce the build-up of inorganic contaminants. This surface treatment is such that it may act as a barrier preventing fluids from interacting with the underlying substrate surface. In some embodiments a surface treatment has no negative impact on the heat transfer capability of the surface of the substrate. In some embodiments surface treatments have one or more of foul resistant properties, foul release properties, anti-corrosion properties, anti-scaling properties, barrier properties, while maintaining or enhancing the heat transfer capability of the surface of the substrate. In some embodiments, a surface treatment has a beneficial impact on the heat transfer capability of the surface of the substrate. For example, the beneficial impact to the heat transfer caused by the surface treatment includes maintaining heat transfer characteristics over an extended time of exposure to material that may otherwise impair heat transfer characteristics. Such surface treatments have industrial applications, for example in heat exchanger systems (e.g., tube and shell, plate and frame) such as used in power generation, oil and gas process cooling, food and beverage preparation, automotive and/or locomotives, heating, ventilation, air conditioning (HVAC), and for example in condensers and/or evaporators for power generation.

In one embodiment, a surface treatment is applied to a substrate. A surface treatment may be applied by painting, spraying, flowing, or otherwise contacting the surface treatment with the substrate. In other embodiments the substrate may be dipped in a solution comprising the surface treatment. The surface treatment may be applied under conditions that allow the surface treatment to react with and/or attach to the substrate. For example, the attachment between the surface treatment and the substrate may be a hydrogen bond, or a covalent linkage. The surface treatment molecules may be applied to the surface in a solution containing water, alcohols, dispersing agents, and/or methods of adjusting the solution pH.

In some embodiments a surface treatment, or the components of which a surface treatment is comprised, can be flowed through a system and the surface treatment will self-assemble on a surface of a substrate. Such embodiments of the present invention may provide for easy application to existing systems, including but not limited to conduits of a variety of sizes and shapes which would not be accessible to prior art surface treatments that require application by painting. In some embodiments, surface treatments of the present invention have a sufficiently low viscosity in solution to allow for application via flowing a surface treatment through a conduit.

A surface treatment may react with the surface to form a surface treatment layer. In one embodiment, the surface treatment layer is of generally uniform density across the surface, for example, a monolayer. In one embodiment, a surface treatment may react with the surface resulting in nonhomogeneous formation and locations of varying density of surface treatment whereby the beneficial effects are still observed. In some embodiments, application of a surface treatment does not affect the macroscopic geometry of the substrate being treated. The surface treatment may be resistant to slight mechanical perturbation due to the chemical attachment of the surface treatment to the surface.

A. Structure

In some embodiments a surface treatment comprises a functional component and a linking component. In some such embodiments the functional component and linking component are capable of attaching together (e.g., hydrogen bond or covalently link) when they are combined, for example before application to a surface or during application to a surface. In some embodiments a surface treatment is derived from a functional component and a linking component, wherein the functional component is attached to the linking component, e.g., via a hydrogen bond or a covalent bond. In some embodiments a surface treatment derived from a functional component and a linking component may be a pre-functionalized silane or an as-manufactured silane (silyl). In some embodiments a pre-functionalized silane or an as-manufactured silane (silyl) may comprise one or more of a hydrophobic moiety, and a surface energy modifying moiety.

A surface treatment may attach, e.g., hydrogen bond or covalently bond, to a surface of a substrate. In some embodiments a surface treatment forms a self-assembled monolayer on a surface of a substrate when the surface treatment is applied to the surface of the substrate. Other embodiments of the invention provide for a treated surface comprising a substrate having a surface, and a surface treatment, wherein the surface treatment comprises a functional component and a linking component, wherein the functional component is attached to the linking component, e.g., via a hydrogen bond or a covalent bond, and wherein the linking component is attached to the surface of the substrate, e.g., via a hydrogen bond or a covalent bond.

In some embodiments a surface treatment comprises one functional component bonded to a linking component. In some embodiments a surface treatment comprises two or more distinct functional components bonded to a linking component, for example three, four or five functional components bonded to a linking component.

In some embodiments an applied surface treatment coats a surface of a substrate. As used herein, the term "coats" or "coating" refers to formation of a layer of surface treatment that covers a portion or substantially all of a surface of a substrate. Such coating may be in the form of a self-assembled monolayer, or may otherwise self-assemble on the surface. In some embodiments a surface treatment covers about 10%, about 20%, about 30%, about 40%, about 50%, about 60%, about 70%, about 80%, about 90%, or about 100% of a surface area of the substrate. In some embodiments an applied surface treatment covers 10% or greater, 20% or greater, 30% or greater, 40% or greater, 50% or greater, 60% or greater, 70% or greater, 80% or greater, 90% or greater, or 100% of a surface area of the substrate.

In some embodiments a surface treatment attaches to a substrate, for example through a covalent linkage. In some embodiments a first end of a linking component is bonded (e.g., hydrogen bonded or covalently bonded) to the substrate and the second end of a linking component is bonded (e.g., hydrogen bonded or covalently bonded) to the functional component. In such embodiments the functional component is exposed distal to the surface of the treated substrate and serves to interact with other fluids and/or organisms that may come in contact with the coated substrate as opposed to the underlying substrate interacting with such fluids and/or organisms. In some embodiments the functional component effectively acts as the surface of the surface treated substrate and, for example, inhibits adhesion of organisms to the substrate. In some embodiments a surface treatment self-assembles on a surface of the substrate when applied to the substrate. In some embodiments a surface treatment forms an ordered assembly on a surface of a substrate. In some embodiments a surface treatment self-assembles in a monolayer. As used herein, a monolayer refers to a generally single layer of applied surface treatment molecules, although there may be some instances where a portion of the applied surface treatment coating has greater than or less than a single layer of molecules.

In some embodiments an applied surface treatment may have an average thickness of about 100 μm to about 10 μm, about 10 μm to about 1 μm, about 1000 nm to about 100 nm, or about 100 nm to about 1 nm. In some embodiments an applied surface treatment has an average thickness of about 1000 nm or less, 100 nm or less, 10 nm or less, 1 nm or less, 100 μm or less, about 50 μm or less, about 10 μm or less, or about 1 μm or less.

In some embodiments, a surface treatment, e.g., a self-assembled monolayer of a surface treatment, includes a plurality of functional components, each having the same chemical structure. In other embodiments the surface treatment comprises two or more (e.g., three, four, five, six, etc.) functional components of differing chemical structures. Differing functional components may have different properties and utilizing a combination of different functional components may provide different preselected properties to the treated substrate. A surface treatment comprising two or more differing functional components may allow the properties of the surface treated substrate to be tuned to the needs of the user.

1. Functional Components

Functional components that may be useful in some embodiments of the present invention provide one or more properties that are beneficial to the substrate to be treated. In some embodiments the functional component comprises a functional moiety. In some embodiments a functional component is hydrophobic. In some embodiments a functional component comprises a hydrophobic functional moiety. In some embodiments the functional component is halogenated.

In some embodiments a functional component may have a contact angle of a water droplet on the treated surface from about 90° to 110°, about 110° to about 140°, or about 140° to about 180°. In some embodiments a functional component may have a contact angle of a water droplet on the treated surface of greater than about 90°, 95°, 100°, 105°, 110°, 115°, 120°, 125°, 130°, 135°, 140°, 145°, 150°, 155°, 160°, 165°, 170°, 175°, or 180°. In some embodiments a functional component may have a contact angle of a water droplet on the treated surface greater than a contact angle of a water droplet on a surface of a substrate without a surface treatment in accordance with the present invention. In some embodiments the functionalization of the surface will result in greater than 5°, 10°, 15°, 20°, 25°, 30°, 35°, 40°, 45°, 50°, 55°, 60°, 65°, 70°, 75°, 80°, 85°, or 90° increase in the contact angle of water when compared to the pre-functionalized surface. In some embodiments a surface treatment or treated surface includes at least a second functional component, for example 2, 3, 4, or more different functional components.

Functional components that may be useful in some embodiments of the present invention include compounds that comprise a functional component reactive group. The functional component reactive group may be located generally opposite the functional moiety, e.g., hydrophobic moiety. The functional component reactive group may have the ability to react with a reactive group on the linking component (i.e., a linking component reactive group) to result in attachment of the functional component with the linking component. For example, a functional component may comprise an amine, an alcohol, an organochloride or other organohalide, and/or a carboxylic acid functional component reactive group. In some embodiments a surface treatment is derived from a functional component that comprises a functional component reactive group, wherein the functional component forms a bond (e.g., a hydrogen bond or a covalent bond) with a first end (A) of a linking component through the functional component reactive group.

Suitable functional components may include, but are not limited to, an amine selected from the group consisting of: 3,3,3-Trifluoro-1-propanamine hydrochloride, 2,2-Difluoroethylamine, 2,2,2-Trifluoroethylamine, 2,2,2-Trifluoroethylamine hydrochloride, 2,2-difluoroethylamine hydrochloride, 3,3,3-trifluoropropylamine, 4-(Trifluoromethyl)aniline hydrochloride, 2,2,3,3,4,4,4-Heptafluorobutylamine, 2,2,3,3,3-pentafluoropropylamine, 3-fluoro-6-hydroxybenzyl amine, 5-Fluoro-1,3-thiazol-2-amine, 5-Fluoro-4-methyl-1,3-thiazol-2-amine, [(5-Fluoro-1H-benzimidazol-2-yl)methyl]amine dihydrochloride, 4-Chloro-6-fluoro-1,3-benzothiazol-2-amine, 3-Fluoro-5-(trifluoromethyl)benzylamine, 4-(Trifluoromethyl)aniline hydrochloride, 2,6-Dichloro-4-(trifluoromethyl)aniline, 4-(Trifluoromethyl)benzylamine, 3-(Trifluoromethyl)aniline, 1H,1H-Perfluorooctylamine, 4,4,5,5,6,6,7,7,8,8,9,9,10,10,11,11,11-Heptadecafluoroundecylamine, 3,3,3-Trifluoro-1-propanamine hydrochloride, and octadecylamine. Suitable functional components also include, but are not limited to, 1-Propanamine, 1-Butanamine, 1-Pentanamine, 1-Hexanamine, 1-Octanamine, 1-Decanamine, 1-Dodecanamine, 1-Tetradecanamine, 1-Hexadecanamine, 1-octadecanamine, and 1-Octanamine, hydrochloride (1:1). Suitable functional components also include, but are not limited to, 2-(2,2,2-trifluoroethoxy)ethanamine, Bis-(2-chloro-ethyl)-methyl-amine, 2-Amino-4,6-dichloropyrimidine, 4-Amino-2,6-dichloropyrimidine, 2-chloro-N,N-dimethylethanamine, 2-chloro-N,N-bis(2-chloroethyl)ethanamine; 1,1,1-trifluoromethanesulfonic acid, compd. with N,N-diethylethanamine (1:1); 2,2,2-trifluoroethanamine; 2-chloro-N-(2-chloroethyl)ethanamine, hydrochloride (1:1); 2-chloro-N,N-diethylethanamine, hydrochloride (1:1); 2-chloroethanamine, hydrochloride (1:1); 2-[(4-chlorophenyl)-2-pyridinylmethoxy]-N,N-dimethylethanamine, (2Z)-2-butenedioate (1:1), 2-chloro-N-methylethanamine, hydrochloride (1:1); 2-chloro-N,N-dimethylethanamine, hydrochloride (1:1); N-[(4-chlorophenyl)methyl]-1-Naphthalenemethanamine, hydrochloride (1:1); and 2-[2-[[4-[3-(4,5-dichloro-2-methylphenyl)-4,5-dihydro-1H-pyrazol-1-yl]phenyl]sulfonyl]ethoxy]-N,N-dimethylethanamine. In some embodiments a functional group may be an amine described herein, wherein one or more fluorine atoms are substituted with chlorine or other halogen. In some embodiments a functional component may be a primary, secondary, or tertiary alkyl amine.

In some embodiments a surface treatment may be derived from an amine, for example, but not limited to an amine selected from the group consisting of: 3,3,3-Trifluoro-1-propanamine hydrochloride, 2,2-Difluoroethylamine, 2,2,2-Trifluoroethylamine, 2,2,2-Trifluoroethylamine hydrochloride, 2,2-difluoroethylamine hydrochloride, 3,3,3-trifluoropropylamine, 4-(Trifluoromethyl)aniline hydrochloride, 2,2,3,3,4,4,4-Heptafluorobutylamine, 2,2,3,3,3-pentafluoropropylamine, 3-fluoro-6-hydroxybenzyl amine, 5-Fluoro-1,3-thiazol-2-amine, 5-Fluoro-4-methyl-1,3-thiazol-2-amine, [(5-Fluoro-1H-benzimidazol-2-yl)methyl]amine dihydrochloride, 4-Chloro-6-fluoro-1,3-benzothiazol-2-amine, 3-Fluoro-5-(trifluoromethyl)benzylamine, 4-(Trifluoromethyl)aniline hydrochloride, 2,6-Dichloro-4-(trifluoromethyl)aniline, 4-(Trifluoromethyl)benzylamine, 3-(Trifluoromethyl)aniline, 1H,1H-Perfluorooctylamine, 4,4,5,5,6,6,7,7,8,8,9,9,10,10,11,11,11-Heptadecafluoroundecylamine, 3,3,3-Trifluoro-1-propanamine hydrochloride, octadecylamine, 1-Propanamine, 1-Butanamine, 1-Pentanamine, 1-Hexanamine, 1-Octanamine, 1-Decanamine, 1-Dodecanamine, 1-Tetradecanamine, 1-Hexadecanamine, and 1-Octanamine, hydrochloride (1:1). Suitable functional components also include, but are not limited to, 2-(2,2,2-trifluoroethoxy)ethanamine, Bis-(2-chloro-ethyl)-methyl-amine, 2-Amino-4,6-dichloropyrimidine, 4-Amino-2,6-dichloropyrimidine, 2-chloro-N,N-dimethylethanamine, 2-chloro-N,N-bis(2-chloroethyl)ethanamine; 1,1,1-trifluoromethanesulfonic acid, compd. with N,N-diethylethanamine (1:1); 2,2,2-trifluoroethanamine; 2-chloro-N-(2-chloroethyl)ethanamine, hydrochloride (1:1); 2-chloro-N,N-diethylethanamine, hydrochloride (1:1); 2-chloroethanamine, hydrochloride (1:1); 2-[(4-chlorophenyl)-2-pyridinylmethoxy]-N,N-dimethylethanamine, (2Z)-2-butenedioate (1:1), 2-chloro-N,N-methylethanamine, hydrochloride (1:1); 2-chloro-N,N-dimethylethanamine, hydrochloride (1:1); N-[(4-chlorophenyl) methyl]-1-Naphthalenemethanamine, hydrochloride (1:1); and 2-[2-[[4-[3-(4,5-dichloro-2-methylphenyl)-4,5-dihydro-1H-pyrazol-1-yl]phenyl]sulfonyl]ethoxy]-N,N-dimethylethanamine. In some embodiments a functional component may be derived from an amine described herein, wherein one or more fluorine atoms are substituted with chlorine or other halogen. In some embodiments a functional component may be a primary, secondary, or tertiary alkyl amine.

Suitable functional components may include, but are not limited to, a carboxylic acid selected from the group consisting of: Trifluoroacetic acid, Perfluorooctanoic acid, Perfluorodecanoic acid, and other Perfluorinated carboxylic acids. In some embodiments a functional group may be or derived from a carboxylic acid described herein, wherein one or more fluorine atoms are substituted with chlorine or other halogen.

In some embodiments a surface treatment may be derived from, a carboxylic acid, including but not limited to a carboxylic acid selected from the group consisting of: Trifluoroacetic acid, Perfluorooctanoic acid, Perfluorodecanoic acid, and other Perfluorinated carboxylic acids. In some embodiments a functional group may be or derived from a carboxylic acid described herein, wherein one or more fluorine atoms are substituted with chlorine or other halogen.

Suitable functional components may be an alcohol, for example, but not limited to an alcohol selected from the group consisting of: 1,1,1,3,3,3-Hexafluoro-2-propanol, 2,2,2-Trifluoroethanol, Nonafluoro-tert-butyl alcohol, 1,1,1,3,3,3-Hexafluoro-2-methyl-2-propanol, 2,2,3,3,4,4,4-Heptafluoro-1-butanol, 1H,1H,2H,2H-Perfluorohexan-1-ol, 2-Trifluoromethyl-2-propanol, 1,1,1-Trifluoro-2-propanol, methanol, ethanol, n-propyl alcohol, isopropylalcohol, cyclohexanol, isobutyl alcohol, tert-amyl alcohol, 2-chloroethanol, 2-bromoethanol, 2-fluoroethanol, 2,2,2-trifluoroethanol, 1,2-Epoxy-2-methylpropane, 1,2-Epoxypentane, 2-Ethylhexyl glycidyl ether, Glycidyl 2,2,3,3-tetrafluoropropyl ether, (2,2,3,3,4,4,5,5,6,6,7,7,8,8,9,9,9-Heptadecafluorononyl)oxirane, Styrene oxide, 4-Fluoro-2-bromophenol methylcyclopropyl ether, Chloroacetyl isocyanate, 4-Chloro-3-(trifluoromethyl)phenyl isocyanate, and 2-Chloro-4-fluorophenyl 2-oxiranylmethyl ether. In some embodiments a functional group may be or derived from an alcohol described herein, wherein one or more fluorine atoms are substituted with chlorine or other halogen.

In some embodiments a surface treatment may be derived from an alcohol, for example, but not limited to an alcohol selected from the group consisting of: 1,1,1,3,3,3-Hexafluoro-2-propanol, 2,2,2-Trifluoroethanol, Nonafluoro-tert-butyl alcohol, 1,1,1,3,3,3-Hexafluoro-2-methyl-2-propanol, 2,2,3,3,4,4,4-Heptafluoro-1-butanol, 1H,1H,2H,2H-Perfluorohexan-1-ol, 2-Trifluoromethyl-2-propanol, 1,1,1-Trifluoro-2-propanol, methanol, ethanol, n-propyl alcohol, isopropylalcohol, cyclohexanol, isobutyl alcohol, tert-amyl alcohol, 2-chloroethanol, 2-bromoethanol, 2-fluoroethanol, 2,2,2-trifluoroethanol, 1,2-Epoxy-2-methylpropane, 1,2-Epoxypentane, 2-Ethylhexyl glycidyl ether, Glycidyl 2,2,3,3-tetrafluoropropyl ether, (2,2,3,3,4,4,5,5,6,6,7,7,8,8,9,9,9-Heptadecafluorononyl)oxirane, Styrene oxide, 4-Fluoro-2-bromophenol methylcyclopropyl ether, Chloroacetyl isocyanate, 4-Chloro-3-(trifluoromethyl)phenyl isocyanate, and 2-Chloro-4-fluorophenyl 2-oxiranylmethyl ether. In some embodiments a functional group may be or derived from an alcohol described herein, wherein one or more fluorine atoms are substituted with chlorine or other halogen.

2. Linking Components

Linking components that may be useful in some embodiments of the present invention are capable of hydrogen bonding and/or covalently linking with the functional component and are capable of hydrogen bonding and/or covalently linking with a surface of a substrate to form a treated surface. In some embodiments, a linking component has a first end and a second end, wherein the first end is capable of reacting with a functional component and the second end is capable of reacting with a surface of a substrate. For example, a linking component may have the structure A-R—B, wherein A is a moiety capable of linking (e.g., covalently bonding or hydrogen bonding) with a functional component, R is a linking chain, (e.g., branched or unbranched hydrocarbon, alkoxy, amine, or ether chain), and B is capable of linking (e.g., covalently bonding or hydrogen bonding) with a surface of a substrate to form a treated surface. In some embodiments a surface treatment or treated surface includes at least a second linking component, for example 2, 3, 4, or more different linking components.

In some embodiments a linking component comprises a moiety (A) that is capable of linking (e.g., covalently bonding or hydrogen bonding) with a reactive group (e.g., an amine, carboxylic acid, or hydroxyl) of a functional component. In some embodiments, a moiety (A) may be epoxide, isocyanate, acrylate, vinyl, alkyl halide, aldehyde, ketone, acid halide, acid anhydride, sulfonyl chloride, alcohol, thiol, acyl chloride, and/or amide.

In some embodiments a linking component comprises a moiety (R), wherein (R) comprises a hydrocarbon, alkoxy chain, or ether chain connecting the A group at one end of the hydrocarbon, alkoxy chain, or ether chain and the B group at the other end of the hydrocarbon, alkoxy chain, or ether chain. A hydrocarbon chain may be an alkyl chain, an alkenyl chain, or an alkynyl chain. An alkyl chain may be a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. Alkenyl chains may be a branched or straight chain group containing only carbon and hydrogen, and containing one or more double bonds that may or may not be conjugated. Alkynyl chains may be a branched or straight chain group containing only carbon and hydrogen, and containing one or more triple bonds. Alkyl, alkenyl, and alkynyl chains may be substituted wherein one or more hydrogen atoms are substituted with a substituent such as halogen, cycloalkyl, alkoxy, amino, hydroxyl, aryl, alkenyl, or carboxyl. In some embodiments a hydrocarbon chain contains one to twenty-four carbon atoms, one to twenty carbon atoms, or five to fifteen carbon atoms. Alkoxy chains may be a straight or branched hydrocarbon chain that includes an oxygen atom at the point of attachment. An example of an alkoxy chain is represented by the formula —OR, where R can be a hydrocarbon chain (e.g., alkyl, alkenyl, or alkynyl chain). Ether chains may be an oxygen atom bound to two independently straight or branched hydrocarbon chains. An example of an ether chain is represented by the formula R—O—R', where R and R' can be identical or distinct hydrocarbon chains (e.g., alkyl, alkenyl, or alkynyl chains). In some embodiments a hydrocarbon chain contains 1, 2, 3, 4, 5, 6, 7, 8, 9, 10, 11, 12, 13, 14, 15, 16, 17, 18, 19, 20, 21, 22, 23, 24, or more carbon atoms.

In some embodiments a linking component comprises a moiety (B) that is capable of covalently linking with a surface of a substrate or linking with a surface of a substrate through hydrogen bonding. In some embodiments B is a silyl group, such as an alkoxy silyl group. In some embodiments the alkoxy silyl may be mono-, di-, or tri-functionalized. A mono-functionalized alkoxy silyl group may be represented by the formula R—Si(OR')(R")(R"') where each of R', R", and R"' are independently hydrogen or hydrocarbon chains, for example, methyl, ethyl, or propyl, and R is the alkyl chain of the linking component described above. A di-functionalized alkoxy silyl group may be represented by the formula R—Si(OR')(OR")(R"') where each of R', R", and R"' are independently hydrogen or hydrocarbon chains, for example, methyl, ethyl, or propyl, and R is the alkyl chain of the linking component described above. A tri-functionalized alkoxy silyl group may be represented by the formula R—Si(OR')(OR")(OR"') where each of R', R", and R"' are independently hydrogen or hydrocarbon chains, for example, methyl, ethyl, or propyl, and R is the alkyl chain of the linking component described above.

In some embodiments a linker may comprise an acrylate linker. Suitable acrylate linker components include, but are not limited to 3-(Trimethoxysilyl)propyl methacrylate; 3-(Trimethoxysilyl)propyl acrylate; 3-aminopropyltriethoxysilane; Bis[(3-triethoxysilyl)propy]amine; 3-aminopropyltrimethoxysilane; bis[(3trimethoxysilyl)propyl]amine; 3-aminopropylmethyldiethoxysilane; 3-aminopropylmethyldimethoxysilane; aminoethylaminopropyltrimethoxysilane; aminoethylaminopropyltriethoxysialne; aminoethylaminopropylmethyldimethoxysilane; diethylenetriaminopropylmethyldimethoxysilane; peperazinylpropylmethyldimethoxysilane; (N-phenylamino)methyltrimethoxysilane; (N-phenylamino)methyltriethoxysilane; 3-(N-phenylamino)propyltrimethoxysilane; diethylaminomethyltriethoxysilane; diethylaminomethylmethyldiethoxysilane; and diethylaminopropyltrimethoxysilane.

In some embodiments a linker may comprise an amino linker. Suitable amino linker components include, but are not limited to N—(N-butyl)-3-ainopropyltrimethoxysilane; trimethoxy(vinyl)silane; and Triethoxyvinylsilane.

In some embodiments a linker may comprise a vinyl linker. Suitable vinyl linker components include, but are not limited to Triacetoxy(vinyl)silane, (azidomethyl)phenethyltrimethoxysilane, p-azidomethylphenyltrimethoxysilane, 3-azidopropyltriethoxysilane, 6-azidosulfonylhexyltriethoxysilane, and 4-(azidosulfonyl)phenethyltrimethoxysilane.

In some embodiments a linker may comprise an azide linker. Suitable azide linker components include, but are not limited to 11-azidoundecyltrimethoxysilane.

In some embodiments a linker may be selected or derived from one or more of the following: 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl)triethoxysilane, (3-glycidoxypropyl)trimethoxysilane, (3-glycidoxypropyl)trimethoxysilane, 2-(3,4-epoxycyclohexyl)ethylmethyldiethoxysilane, (3-glycidoxypropyl)methyldiethoxysilane, (3-glycidoxypropyl)methyldimethoxysilane, (3-glycidyloxypropyl)trimethoxysilane, (3-glycidyloxypropyl)triethoxysilane, (3-glycidoxypropyl)dimethylethoxysilane, acetoxymethyltriethoxysilane, acetoxymethyltrimethoxysilane, 2-[(acetoxy(polyethyleneoxy)propyl]triethoxysilane, 3-acetoxypropyltrimethoxysilane, benzoyloxypropyltrimethoxysilane, 10-(carbomethoxy)decyldimethylmethoxysilane, 2-(carbomethoxy)ethyltrimethoxysilane, triethoxysilylpropoxy(polyethyleneoxy) dodecanoate, n-(hydroxyethyl)-n-methylaminopropyltrimethoxysilane, hydroxymethyltriethoxysilane, n-(3-triethoxysilylpropyl) gluconamide, n-(3-triethoxysilylpropyl)-4-hydroxybutyramide, n-(triethoxysilylpropyl)-o-polyethylene oxide urethane, n-(hydroxyethyl)-n,n-bis(trimethoxysilylpropyl) amine, 3-isocyanatopropyltriethoxysilane, 3-isocyanotopropyltrimethoxysilane, 3-isocyanatopropylmethyldiethoxysilane, 3-isocyanatopropylmethyldimethoxysilane, (thiocyanatomethyl)phenethyltrimethoxysilane, 3-thiocyanatopropyltriethoxysilane, n-(3-triethoxysilylpropyl)-o-t-butylcarbamate, triethoxysilylpropyl ethylcarbamate A linking component may comprise a single reactive group or a plurality of independently selected reactive groups presented at different locations on the linking component. Such plurality of linking components may allow the attachment of multiple independently selected functional components to an individual linking component.

In some embodiments a surface treatment is derived from a linking component described herein.

3. As-Manufactured Silane (Silyl)

In some embodiments a functional component and linking component are covalently bonded together before being applied to the substrate, that is, in some embodiments a surface treatment is derived from a functional component and a linking component. In some embodiments the surface treatment has a structure of X—R—B, wherein X is functional component as described above (e.g., comprising a functional moiety, such as a halogen (e.g., F, Cl, I, or Br) or being a halogenated component), R is a hydrocarbon, alkoxy chain, or ether chain as described above, and B is capable of linking (e.g., covalently bonding or hydrogen bonding) with a surface of a substrate to form a treated surface, as described above. In some embodiments a surface treatment is an alkyl silane. In some embodiments a surface treatment is an alkoxy silane. In some embodiments a surface treatment is an alkyl alkoxy silane, for example a mono alkyl trialkoxy silane, a bialkyl bialkoxy silane, or a trialkyl, trialkoxy silane. In some embodiments an alky silane, alkoxy silane, or alkyl alkoxy silane may be halogenated. In some embodiments a halogenated component is mono or di substituted with a halogen. In some embodiments a surface treatment is a halogenated silane. In some embodiments a surface treatment is a halogenated alkyl silane. In some embodiments a surface treatment is a halogenated alkoxy silane. In some embodiments a surface treatment is a halogenated alkyl alkoxy silane, for example a halogenated bialkyl bialkoxy silane, a halogenated monoalkyl, trialkoxy silane, or a halogenated trialkyl, monoalkoxy silane.

For example, in some embodiments a surface treatment comprises a pre-functionalized silane, for example and without limitation, trimethoxy (3,3,3-trifluoropropyl)silane (CAS #429-60-7), (3-chloropropyl)trimethoxysilane (CAS #2530-87-2), dimethoxy-methyl(3,3,3-trifluoropropyl)silane (CAS #358-67-8), 1H,1H,2H,2H-Perfluorooxtyltriethoxysilane (CAS #3069-40-7), (3-chloropropyl)triethoxysilane, triethoxyoctylsilane, triethoxy(3,3,4,4,5,5,6,6,7,7,8,8,8-tridecafluorooctyl)silane, trimedioxy(3,3,3-trifluoropropyl)silane, trimethoxyoctylsilane, and (3-Glycidoxypropyl)methyldimethoxysilane, and Trichloro (1H,1H,2H,2H-perfluorooctyl)silane, (chloromethyl)diethoxymethylsilane, (3-isocyanatopropyl)trimethoxysilane, 3-chloropropyl)dimethoxymethylsilane, (2-chloroethyl)triethoxysilane, methoxydimethyloctadecylsilane, [3-(2,4-cyclopentadien-1-yl)propyl]trimethoxysilane, diethoxymethyl (2-phenylpropyl)silane, diethoxymethyloctadecylsilane, triethoxy(1,4,5,6,7,7-hexachlorobicyclo[2.2.1]hept-5-en-2-yl)silane, (chloromethyl)triethoxysilane, triethoxyethylsilane, (3-chloropropyl)triethoxysilane, dichloromethyl[3-[1,2,2,2-tetrafluoro-1-silane, (trifluoromethyl)ethoxy]propyl]silane, dodecyltriethoxysilane, diethoxymethyl-2-propen-1-yl-silane, (2-chloroethyl)triethoxysilane, dimethoxymethyl(3,3,3-trifluoropropyl)silane, 2,2,2-trifluoro-N-(2-(triethoxysilyl)ethyl)ethan-1-amine, and trimethoxy(3,3,3-trifluoropropyl)silane. In some embodiments, covalently bonded linker components and functional components (e.g., an as-manufactured silane or silyl or a pre-functionalized silane) having a general structure of a functional component as described herein (e.g., including a hydrophobic moiety), covalently bonded (or otherwise linked) to a linker component having a silane or silyl group may be useful in surface treatments and methods.

The following tables illustrate example combinations of linking components and functional components and the resulting surface treatment (e.g. as-manufactured silane or silyl) formed or derived therefrom. It is to be understood that this table is not limiting and that any of the functional components and linker components taught herein can be combined in similar fashion to obtain surface treatments within the scope of the invention.

| Linking Component | Functional Component (2,2,2-Trifluoroethylamine) |
|---|---|
| (3-glycidyloxypropyl) trimethoxysilane | 13,13,13-trifluoro-3,3-dimethoxy-2,7-dioxa-11-aza-3-silatridecan-9-ol |
| (3-glycidyloxypropyl) triethoxysilane | 4,4-diethoxy-14,14,14-trifluoro-3,8-dioxa-12-aza-4-silatetradecan-10-ol |
| 3-(triethoxysilyl) propyl isocyanate | 1-(3-(triethoxysilyl)propyl)-3-(2,2,2-trifluoroethyl)urea |
| 3-(trimethoxysilyl) propyl isocyanate | 1-(2,2,2-trifluoroethyl)-3-(3-(trimethoxysilyl)propyl)urea |

| Linking Component | Functional Component (2,2-Difluoroethylamine) |
|---|---|
| (3-glycidyloxypropyl) trimethoxysilane | 13,13-difluoro-3,3-dimethoxy-2,7-dioxa-11-aza-3-silatridecan-9-ol |
| (3-glycidyloxypropyl) triethoxysilane | 4,4-diethoxy-14,14-difluoro-3,8-dioxa-12-aza-4-silatetradecan-10-ol |
| 3-(triethoxysilyl) propyl isocyanate | 1-(3-(triethoxysilyl)propyl)-3-(2,2-difluoroethyl)urea |
| 3-(trimethoxysily) propyl isocyanate | 1-(2,2-difluoroethyl)-3-(3-(trimethoxysilyl)propyl)urea |

| Linking Component | Functional Component (Octadecylamine) |
|---|---|
| (3-glycidyloxypropyl) trimethoxysilane | 3,3-dimethoxy-2,7-dioxa-11-aza-3-silanonacosan-9-ol |
| (3-glycidyloxypropyl) triethoxysilane | 4,4-diethoxy-3,8-dioxa-12-aza-4-silatriacontan-10-ol |
| 3-(triethoxysilyl) propyl isocyanate | 1-octadecyl-3-(3-(triethoxysilyl)propyl)urea |
| 3-(trimethoxysdyl) propyl isocyanate | 1-octadecyl-3-(3-(trimethoxysilyl)propyl)urea |

Similarly, in some embodiments a functional component comprising 2,2,2-Trifluoroethanol may be combined with a linking component comprising (3-glycidyloxypropyl)triethoxysilane to form a surface treatment comprising 4,4-diethoxy-14,14,14-trifluoro-3,8,12-trioxa-4-silatetradecan-10-ol. In some embodiments a functional component comprising 4-Chloro-6-fluoro-1,3-benzothiazol-2-amine may be combined with a linking component comprising (3-glycidyloxypropyl)trimethoxysilane to form a surface treatment comprising 1-((4-chloro-6-fluorobenzo[d]thiazol-2-yl)amino)-3-(3-(trimethoxysilyl)propoxy)propan-2-ol. These examples are for illustrative purposes and are not to be construed as limiting.

4. Substrates

Substrates that may be useful in some embodiments of the present invention include substrates having a surface which may facilitate attachment with a surface treatment, for example a linking component of a surface treatment. In some embodiments a substrate has a surface comprising one or more chemical groups which are reactive with a surface treatment, for example a linking component of a surface treatment. In some embodiments a substrate has a surface comprising one or more hydroxyl groups, which may facilitate attachment to a surface treatment, for example a linking component comprising an alkoxy silyl group. These substrates include metals including, copper, nickel, iron, aluminum, chromium, titanium, zinc, tin, lead, steel, and molybdenum. Additional substrates include those comprising $SiO_2$ including pure $SiO_2$ and glasses including those referred to as soda-lime, borosilicate, aluminosilicate, and germanium oxide. Additional substrates include ceramics as well as inorganics such as fiberglass which may be incorporated in an organic matrix. Additionally, organic polymers presenting appropriate hydroxyl groups or similar reactive moieties coated on any of the above listed substrates may facilitate attachment of the treatment to the surface, such as epoxy paints/coatings, polyurethanes, etc. In some embodiments a substrate may comprise a plastic such as polyvinylchloride (PVC), polyethylene (e.g., high density polyethylene), and polyoxymethylene (e.g., DELRIN™).

In some embodiments the substrate may be in the form of a pipe, wherein other embodiments the substrate may be in the form of a panel. The substrate may have any thickness and surface area suitable for the applicable use of the material.

In some embodiments a substrate may include a surface that includes a pre-coated material to which the surface treatment attaches. In some embodiments the substrate may include a polymeric pre-coated material and/or a plastic pre-coated material. Exemplary polymeric pre-coated materials include epoxies, polyurethanes, and acrylics.

In some embodiments the substrate is a component in a heat exchanger, a condenser, an evaporator, a cooling tower, or other apparatus. In some embodiments the substrate forms a fluid conduit (e.g., and the surface is an internal surface of the fluid conduit (e.g., in the heat exchanger, condenser, evaporator, or cooling tower).

II. Methods of Preparing

In some embodiments a method of preparing a treated surface comprises combining a functional component and a linking component to form a surface treatment and applying the surface treatment to a surface of a material to form a treated surface. In some embodiments the functional component and the linking component are combined during application to a surface of a material. The functional component and the linking component may be combined with one or more solvents (e.g., water, organic solvent(s), or combinations thereof). In some embodiments a method further comprises diluting the surface treatment (e.g., the individual components of linker component and functional component, the combined mixture of functional component and linker component, or the surface treatment resulting from hydrogen or covalent bonding between the functional component and the linker component) in a diluent (e.g., water, organic solvent(s), or combinations thereof) before applying the surface treatment to the surface. The diluent may be the same or different from the solvent.

Figure 2:
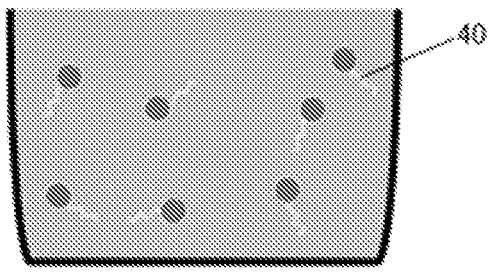
FIG. 2 is a schematic of a step of a method of preparing a surface treatment according to an embodiment of the invention.
Figure 3:
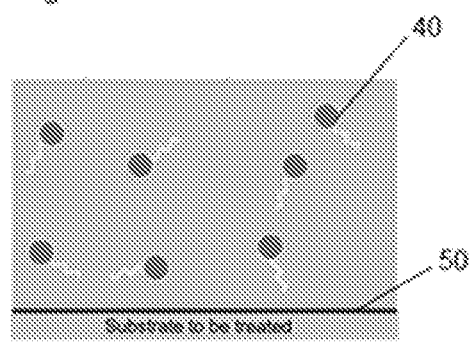
FIG. 3 is a schematic of a step of a method of preparing a surface treatment according to an embodiment of the invention.
Figure 4:
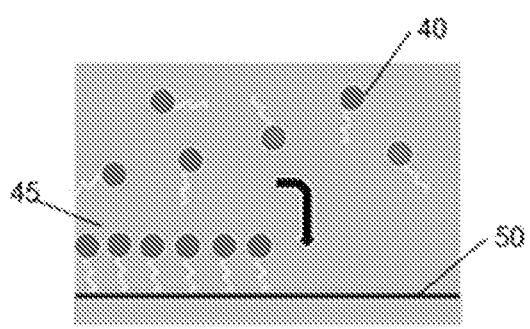
FIG. 4 is a schematic of a step of a method of preparing a surface treatment according to an embodiment of the invention.
Figure 5:
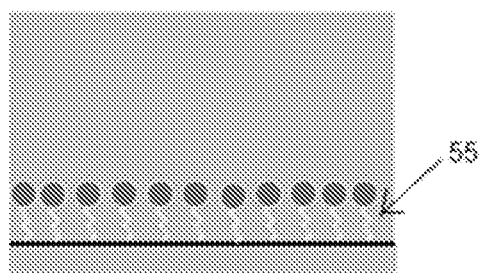
FIG. 5 is a schematic of a treated surface in accordance with an embodiment of the invention.

Referring to FIG. 1, a functional component 10 and a linking component 20 are individual components that are combined in a solvent 30. Referring to FIG. 2, the functional component 10 and the linking component 20 hydrogen bond or covalently attach to form a surface treatment 40. Referring to FIG. 3, the surface treatment is applied to a substrate 50. Referring to FIG. 4, the surface treatment 40 forms an ordered assembly 45 on a surface 55 of the substrate 50 to form a treated surface 60. The surface treatment may either hydrogen bond or covalently attach to the surface of the substrate.

In some embodiments a method comprises combining a functional component and a linking component under conditions sufficient to react (e.g., hydrogen bond or covalently bond) the functional component and the linking component together to form a surface treatment. The functional component and linking component may be combined during application to the substrate or prior to application to the substrate. The functional component may comprise one or more functional component reactive groups and the linking component may comprise one or more linking component reactive groups, wherein the functional component reactive group may have the ability to react with a linking component reactive group to result in attachment of the functional component with the linking component. In some embodiments the functional component reactive group and the linking component reactive group have the ability to hydrogen bond or covalently bond, forming a surface treatment.

In some embodiments the functional component and the linking component are provided for reaction in relative amounts such that a sufficient number of functional component reactive groups are present to react with all linking component reactive groups. That is, a functional component and a linking component may be provided in amounts such that the mole ratio of functional component reactive group to linking component reactive group is about 1:1, about 1.5:1, about 2:1, about 2.5:1, about 3:1, about 4:1, about 5:1, about 6:1, about 7:1, about 8:1, about 9:1, or about 10:1. In some embodiments a functional component and a linking component may be provided in amounts such that the mole ratio of functional component reactive group to linking component reactive group is in a range of about 1:1 to about 10:1, about 1:1 to about 5:1, about 1:1 to about 2.5:1, or about 1:1 to about 2:1. Additionally, in some embodiments, providing a greater than equimolar amount of functional component reactive groups and linking component reactive groups would not be detrimental to surface treatment performance, and may be desirable. Accordingly, in some embodiments a functional component and a linking component may be provided in amounts such that the mole ratio of functional component reactive group to linking component reactive group is about 1:1, about 1.5:1, about 2:1, about 2.5:1, about 3:1, about 4:1, about 5:1, about 6:1, about 7:1, about 8:1, about 9:1, or about 10:1. In some embodiments a functional component and a linking component may be provided in amounts such that the mole ratio of functional component reactive group to linking component reactive group is about 1:1 to about 5:1, about 1:1 to about 2.5:1, or about 1:1 to about 2:1.

In some embodiments two or more different functional components are provided, for example 2, 3, 4, or more different functional components. In some embodiments two or more different linking components are provided, for example 2, 3, 4, or more different linking components.

In some embodiments a functional component and/or linking component may be provided separately, each in any suitable solvent or system of solvents, prior to the functional component and linking component being combined. In some embodiments, prior to the functional component and the linking component being combined, the functional component is provided in a first solvent, which may be water, an organic solvent (e.g., ethanol, methanol, propanol), or any combination thereof, and the linking component is provided in a second solvent, which may independently be water, an organic solvent (e.g., ethanol, methanol, propanol), or any combination thereof. In some embodiments the first and second solvents are the same, while in other embodiments the first and second solvents are different.

In some embodiments a functional component and a linking component may be combined together with a solvent or system of solvents. In some embodiments a solvent is water. In other embodiments a solvent is an organic solvent, e.g., ethanol, methanol, propanol, or combinations thereof. In some embodiments a system of solvents comprises two or more solvents, for example chosen from water, methanol, ethanol, propanol, other organic solvents, and inorganic solvents.

In some embodiments the functional component is provided in a solvent prior to being combined with the linking component, during combination with the linking component, and/or after combination with the linking component. The functional component may be provided in an amount of 10% or less, 5% or less, 2.5% or less, 1% or less, 0.5% or less, 0.1% or less, 0.05% or less, 0.01% or less, 0.005% or less, 0.001% or less, 0.0005% or less, or 0.0001% or less (w/v) or (v/v) of the solvent. In some embodiments the functional component may be provided in an amount in a range of about 0.0001% to about 10%, about 0.0001% to about 1%, about 0.0001% to about 0.1%, about 0.0001% to about 0.01%, about 0.0001% to about 0.001%, about 0.001% to about 1%, about 0.001% to about 0.1%, about 0.001% to about 0.01%, about 0.01% to about 1%, or about 0.01% to about 0.1% (w/v) or (v/v) of the solvent. In some embodiments the functional component may be provided in an amount is about 0.0001%, about 0.0005%, about 0.001%, about 0.0025%, about 0.005%, about 0.0075%, about 0.01%, about 0.025%, about 0.05%, about 0.075%, about 0.1%, about 0.25%, about 0.5%, about 0.75%, about 1.0%, about 1.5%, or about 2% (w/v) or (v/v) of the solvent.

In some embodiments the linking component is provided in a solvent prior to being combined with the functional component, during combination with the functional component, and/or after combination with the functional component. The linking component may be provided in an amount of 10% or less, 5% or less, 2.5% or less, 1% or less, 0.5% or less, 0.1% or less, 0.05% or less, 0.01% or less, 0.005% or less, 0.001% or less, 0.0005% or less, or 0.0001% or less (w/v) or (v/v) of the solvent. In some embodiments in which the linking component is provided in a solvent, the linking component may be provided in an amount in a range of about 0.0001% to about 10%, about 0.0001% to about 1%, about 0.0001% to about 0.1%, about 0.0001% to about 0.01%, about 0.0001% to about 0.001%, about 0.001% to about 1%, about 0.001% to about 0.1%, about 0.001% to about 0.01%, about 0.01% to about 1%, or about 0.01% to about 0.1% (w/v) or (v/v) of the solvent. In some embodiments in which the linking component is provided in a solvent, the linking component may be provided in an amount is about 0.0001%, about 0.0005%, about 0.001%, about 0.0025%, about 0.005%, about 0.0075%, about 0.01%, about 0.025%, about 0.05%, about 0.075%, about 0.1%, about 0.25%, about 0.5%, about 0.75%, about 1.0%, about 1.5%, or about 2% (w/v) or (v/v) of the solvent.

In some embodiments a surface treatment that is derived from a functional component and a linking component is combined together with a solvent or system of solvents. In some embodiments a solvent is water. In other embodiments a solvent is an organic solvent, e.g., ethanol, methanol, propanol, or combinations thereof. In some embodiments a system of solvents comprises two or more solvents, for example chosen from water, methanol, ethanol, propanol, other organic solvents, and inorganic solvents. The surface treatment may be provided in an amount of 10% or less, 5% or less, 2.5% or less, 1% or less, 0.5% or less, 0.1% or less, 0.05% or less, 0.01% or less, 0.005% or less, 0.001% or less, 0.0005% or less, or 0.0001% or less (w/v) or (v/v) of the solvent. In some embodiments in which the linking component is provided in a solvent, the linking component may be provided in an amount in a range of about 0.0001% to about 10%, about 0.0001% to about 1%, about 0.0001% to about 0.1%, about 0.0001% to about 0.01%, about 0.0001% to about 0.001%, about 0.001% to about 1%, about 0.001% to about 0.1%, about 0.001% to about 0.01%, about 0.01% to about 1%, or about 0.01% to about 0.1% (w/v) or (v/v) of the solvent. In some embodiments in which the linking component is provided in a solvent, the linking component may be provided in an amount is about 0.0001%, about 0.0005%, about 0.001%, about 0.0025%, about 0.005%, about 0.0075%, about 0.01%, about 0.025%, about 0.05%, about 0.075%, about 0.1%, about 0.25%, about 0.5%, about 0.75%, about 1.0%, about 1.5%, or about 2% (w/v) or (v/v) of the solvent. In some embodiments the surface treatment is an as-manufactured silane (or silyl), e.g., a pre-functionalized silane.

In some embodiments the method comprises adding an acid or base to the surface treatment to adjust the pH of the surface treatment. It may be desirable to facilitate hydrolysis of the silyl group preparing it for reaction with the chemical groups present on the substrate surface. For example, acids such as acetic acid, phosphoric acid, citric acid, nitrous acid, hydrofluoric acid, formic acid, benzoic acid, carbonic acid, hypochlorous acid, hydrocyanic acid, etc. may be added to the surface treatment. For example, bases such as ammonia, pyridine, ammonium hydroxide, etc. may be added to the surface treatment. In some embodiments, an acid or base is added to adjust the pH of the surface treatment to about 2, about 2.5, about 3, about 3.5, about 4, about 4.5, about 5, about 5.5, about 6, about 6.5, about 7, about 7.5, about 8, about 8.5, about 9, about 9.5, about 10, about 10.5 about 11, or about 11.5. In some embodiments, an acid or base is added to the surface treatment to adjust the pH of the surface treatment to a range of about 2 to about 8, about 3 to about 7, about 4 to about 6, about 3 to about 5, about 6 to about 8, about 7 to about 10, about 8 to about 11, or about 9 to about 12.

In some embodiments one or more additional components are applied to the surface of the substrate to facilitate reaction of the surface treatment with the surface of the substrate. In some embodiments an additional component is applied separately from the surface treatment, while in other embodiments the surface treatment and additional component are applied together to the surface of the substrate. In some embodiments an additional component may be a solvent for example, water, acetone, methanol, ethanol, and/or propanol. In some embodiments an additional component may be a pH adjusting ingredient, for example an acid or a base.

In some embodiments the method for applying a surface treatment to a substrate includes dipping the substrate in the surface treatment, flowing the surface treatment over the substrate, spraying/misting the substrate with the surface treatment or application of the surface treatment with an applicator such as a sponge or brushing the surface treatment onto the substrate. In some embodiments applying includes flowing the surface treatment through an apparatus comprising the surface, wherein the surface is an internal surface of a conduit through which the surface treatment is flowed. In some embodiments applying includes flowing the surface treatment over an apparatus comprising the surface, wherein the surface is an external surface (such as an external surface of a fluid conduit). In some embodiments the apparatus is a component in a heat exchanger, a condenser, an evaporator, or a cooling tower; accordingly, in some embodiments the substrate is a component of a heat exchanger, a condenser, an evaporator, or a cooling tower. In some embodiments the substrate forms a fluid conduit in the heat exchanger, condenser, an evaporator, or a cooling tower and the surface is an internal surface of the fluid conduit. Accordingly, in some embodiments the surface treatment is applied to the internal surface of the fluid conduit, for example by flowing a fluid including the surface treatment through the fluid conduit. In some such embodiments the surface treatment may self-assemble on the surface of the substrate, forming a treated surface.

In some embodiments, the method includes curing the treated surface, for example at room temperature for upwards of an hour. In some embodiments the treated surface is allowed to cure for 1 minute or greater, 10 minutes or greater, 20 minutes or greater, 30 minutes or greater, 40 minutes or greater, 50 minutes or greater, or 60 minutes or greater. In some embodiments the treated surface is allowed to cure for about 1 minute to about 24 hours, about 1 minute to about 12 hours, about 1 minute to about 6 hours, about 1 minute to about 3 hours, about 1 minute to about 1.5 hours, about 30 minutes to about 1 hour, about 6 hours to 24 hours, about 10 hours to 24 hours, or about 12 hours to 24 hours. In some embodiments the system is cured at room temperature. In some embodiments curing may be accelerated by curing at an elevated temperature (elevated relative to room temperature), e.g., about 20° C. to about 200° C., about 20° C. to about 100° C., about 20° C. to about 75° C., about 20° C. to about 50° C., about 100° C. to about 200° C., about 50° C. to about 150° C. for about 1 minute to about 30 minutes, or about 5 minutes to about 15 minutes, about 15 minutes to about 30 minutes, about 20 minutes to about 30 minutes, about 30 minutes to 60 minutes, greater than 10 minutes, greater than 30 minutes, or greater than 60 minutes.

In some embodiments, the method includes preheating the surface of the substrate prior to application of the surface treatment to the surface of the substrate. It may be desirable to preheat the substrate to a temperature lower than the boiling point of a solvent that may be applied to the surface of the substrate together with the surface treatment. Accordingly, in some embodiments a surface of a substrate may be preheated to about 30° C. to about 100° C., about 30° C. to about 90° C., about 30 to about 80° C., about 30° C. to about 70° C., about 30° C. to about 60° C., about 30° C. to about 50° C., about 30° C. to about 40° C., about 40° C. to about 100° C., about 60° C. to 100° C., or about 80° C. to 100° C.

In some embodiments the method further comprising applying a coating to the surface of the substrate before applying the surface treatment. In some embodiments the substrate includes a coating. In some embodiments the coating comprises one or more of epoxy, polyurethane, and acrylic.

In some embodiments, the method of applying surface treatment to a substrate includes applying the surface treatment to at least a portion of a surface of a substrate. In some embodiments, the method includes applying a surface treatment to the entirety of the surface of the substrate in a single application. Application of the surface treatment may be accomplished, for example, by exposing the surface of the substrate to a solution containing the surface treatment through immersing the substrate, flowing the solution over the substrate, misting or spraying the substrate with the application solution, or applying the surface treatment with an applicator (including sponge or brush). These application methods may be conducted in a controlled facility or may be conducted at the site of installation of the equipment to be treated. The versatility and ease of application of the surface treatment to the complex geometries of heat exchanger loops and other substrates allows for a significantly lower burden of implementation for end use customers.

III. Applications

Surface treatments described herein may be useful on a variety of surfaces and for a variety of applications. In some embodiments, a surface treatment or treated surface is useful on a surface that is exposed to water of varying chemistries, for example marine applications. Exemplary applications include conduits, for example in heat exchanger systems.

In one embodiment the surface treatment may be utilized to inhibit biological accumulation. In some embodiments the surface treatment may inhibit biological accumulation by means other than anti-fouling, that is by means other than leeching a substance to kill organisms, or otherwise providing a toxic effect to organisms. In some embodiments the surface treatment inhibits biological accumulation by providing a foul resistant and/or foul release effect. As used herein, foul resistant is a property of the surface which prevents organisms from attaching to the surface. As used herein, foul release is a property of the surface wherein organisms may accumulate on the surface under certain conditions, such as when there is little or no force from fluid flowing across the surface, but wherein any accumulated organisms are released from the surface when a force, such as an increased flow rate, is applied. In some embodiments the surface treatment results in an effective surface (i.e., the exposed surface treatment acts as the effective surface), which physically deters settlement and/or to which organisms cannot easily adhere, and the surface treatment and/or treated surface can accordingly be called foul resistant or foul release rather than anti-fouling (i.e. biocidal) treatments. Foul resistant properties can be characterized by barnacle adhesion measurements, for example, ASTM D 5618-94. Without being bound by any theory of operation, the insulative effect of the surface treatment protecting the surface of the substrate may result in decreased adhesion and/or accumulation of organisms. In some embodiments a treated surface resists adhesion and/or accumulation of organisms compared to a surface of the substrate without surface treatment. For example, a treated surface may acquire biological accumulation at a slower rate than a surface without application of a surface treatment, under the same temperature and pressure conditions and under exposure to the same source of water for the same period of time.

In some embodiments, a surface of a substrate may be covered with an amount of surface treatment effective to reduce biological accumulation by about 10% or greater, by about 20% or greater, by about 30% or greater, by about 40% or greater, by about 50% or greater, by about 60% or greater, by about 70% or greater, by about 80% or greater, or by about 90% or greater over a period of time, such as over one week, one month, six months, one year, two years, or more, as compared to a substrate without the surface treatment.

Another embodiment may result in the treated surface displaying decreased inorganic scale deposition providing an anti-scaling effect. In some embodiments a treated surface resists scaling compared to a surface of the substrate without surface treatment. For example, a treated surface may acquire inorganic accumulation at a slower rate than a surface of a substrate comprising the same material but without application of a surface treatment, under the same temperature and pressure conditions and under exposure to the same source of water for the same period of time.

In some embodiments, a surface of a substrate may be covered with an amount of surface treatment effective to reduce inorganic scale accumulation by about 10% or greater, by about 20% or greater, by about 30% or greater, by about 40% or greater, by about 50% or greater, by about 60% or greater, by about 70% or greater, by about 80% or greater, or by about 90% or greater over a period of time, such as over one week, one month, six months, one year, two years, or more, compared to a substrate without the surface treatment.

Other embodiments may result in the treated surface displaying a decreased corrosion rate which, without being bound by any theory of operation, may be a result of the insulating effect of the treatment protecting the surface from exposure to the corrosive media. In some embodiments a treated surface resists corrosion compared to a surface of the substrate without surface treatment. For example, a treated surface may corrode at a slower rate than a surface of a substrate comprising the same material but without application of a surface treatment, under the same temperature and pressure conditions and under exposure to the same source of water for the same period of time.

In some embodiments, a surface of a substrate may be covered with an amount of surface treatment effective to reduce corrosion by about 10% or greater, by about 20% or greater, by about 30% or greater, by about 40% or greater, by about 50% or greater, by about 60% or greater, by about 70% or greater, by about 80% or greater, or by about 90% or greater over a period of time, such as over one week, one month, six months, one year, two years, or more, compared to a substrate without the surface treatment.

One way of measuring the foul resistance and or foul release, corrosion, and/or scale of a material is to measure the change in mass of the material over time. Accordingly, in some embodiments of the invention showing improved foul resistance and/or foul release, and/or scaling resistance rates, the treated surface of a substrate will have a slower rate of mass increase compared to a surface of an otherwise similar substrate having no surface treatment, under the same temperature and pressure conditions and under exposure to the same source of water for the same period of time. In some embodiments of the invention showing improved corrosion resistance, the treated surface of a substrate will have a slower rate of mass decrease compared to a surface of an otherwise similar substrate having no surface treatment, under the same temperature and pressure conditions and under exposure to the same source of water for the same period of time.

In some embodiments, a surface of a substrate may be covered with an amount of surface treatment effective to reduce mass increase by about 10% or greater, by about 20% or greater, by about 30% or greater, by about 40% or greater, by about 50% or greater, by about 60% or greater, by about 70% or greater, by about 80% or greater, or by about 90% or greater over a period of time, such as over one week, one month, six months, one year, two years, or more, compared to a substrate without the surface treatment.

Additionally, the treated surface may display hydrophobic properties and/or decreased surface energy which may alter the interaction of different fluids with the treated surface. In some embodiments a treated surface may have a contact angle of a water droplet on the treated surface of greater than about 1°, 5°, 10°, 15°, 20°, 25°, 30°, 35°, 40°, 45°, 50°, 55°, 60°, 65°, 70°, 75°, 80°, 85°, or 90°. In some embodiments a treated surface may have a contact angle of a water droplet on the treated surface greater than a contact angle of a water droplet on a surface of a substrate without a surface treatment in accordance with the present invention. This increase in water contact angle following surface treatment could be 1°, 5°, 10°, 15°, 20°, 25°, 30°, 35°, 40°, 45°, 50°, 55°, 60°, 65°, 70°, 75°, 80°, 85°, or 90°.

In some embodiments a treated surface may show no decrease in heat transfer from a fluid exposed to the treated substrate and that of a fluid or solid on the opposite side of the treated substrate compared to a substrate without surface treatment. In some embodiments a treated surface may show an increase in heat transfer from a fluid exposed to the treated substrate and that of a fluid or solid on the opposite side of the treated substrate compared to a substrate without surface treatment. For example, in some embodiments a treated surface has a heat transfer coefficient within about ±40%, about ±30%, about ±20%, about ±10%, about ±5%, about ±1%, about ±0.5%, or about ±0.1% of the heat transfer coefficient of a substrate without a surface treatment in accordance with the present invention. For example, in some embodiments a treated surface has a heat transfer coefficient about 40%, about 30%, about 20%, about 10%, about 5%, about 1%, about 0.5%, or about 0.1% greater than the heat transfer coefficient of a substrate without a surface treatment in accordance with the present invention.

IV. EXAMPLES, USE CASES, RESULTS

Example 1

Substrate Preparation: 70:30 copper nickel tube of 1" outer diameter and 0.065" wall thickness was cleaned with acetone to remove any oils from factory processing.

Reaction: 0.5 g 2,2,2-trifluoroethylamine hydrochloride (TFEA) was added to 0.5 mL of distilled water and mixed until dissolved. 1 mL (3-glycidyloxypropyl)triethoxysilane (GPTES) was added to the stirring solution drop wise. The mixture was allowed to react for 5 minutes with stirring.

Coating: The entirety of the reaction solution was added to the reaction apparatus 600 shown in FIG. 6 via a funnel 601 to a flow loop of distilled water totaling 1 liter where a 2' portion of the loop consisted of a 70:30 clean copper nickel tube 603. This loop was operated using a pump 602 at a flow rate of approximately 100 gallons per hour for a total of 10 minutes. The treatment solution was then removed from the loop and the loop was filled with fresh distilled water as a rinse step. The now treated tube 603 was removed from the flow loop and allowed to air dry.

Figure 7:
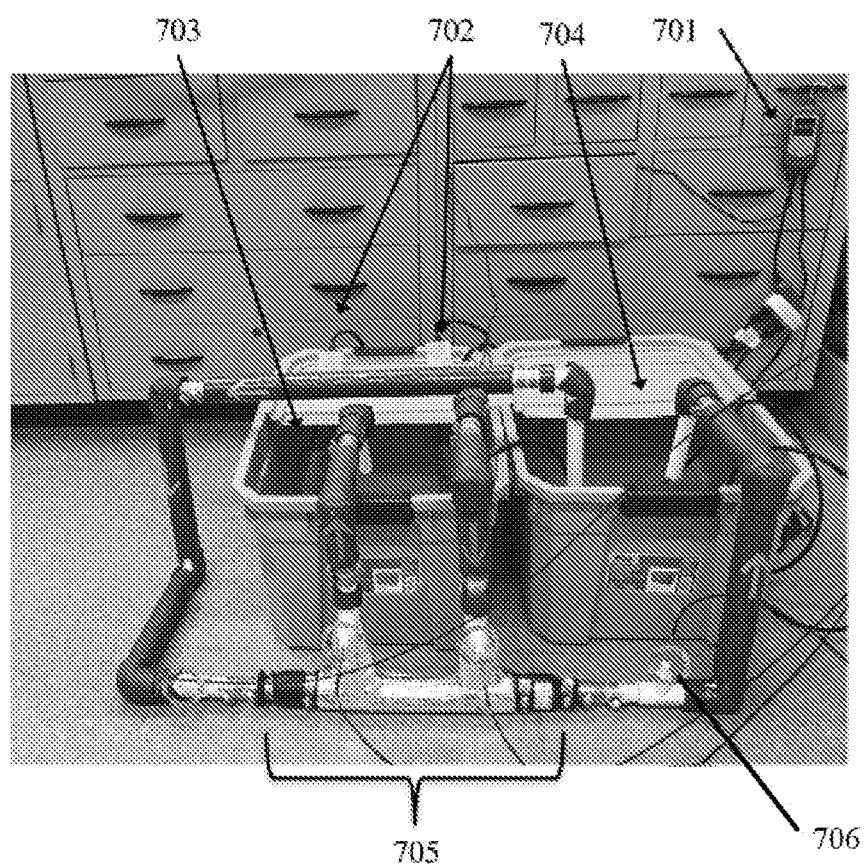
FIG. 7 is a photograph of a testing apparatus used in accordance with an embodiment of the invention.
Figure 8:
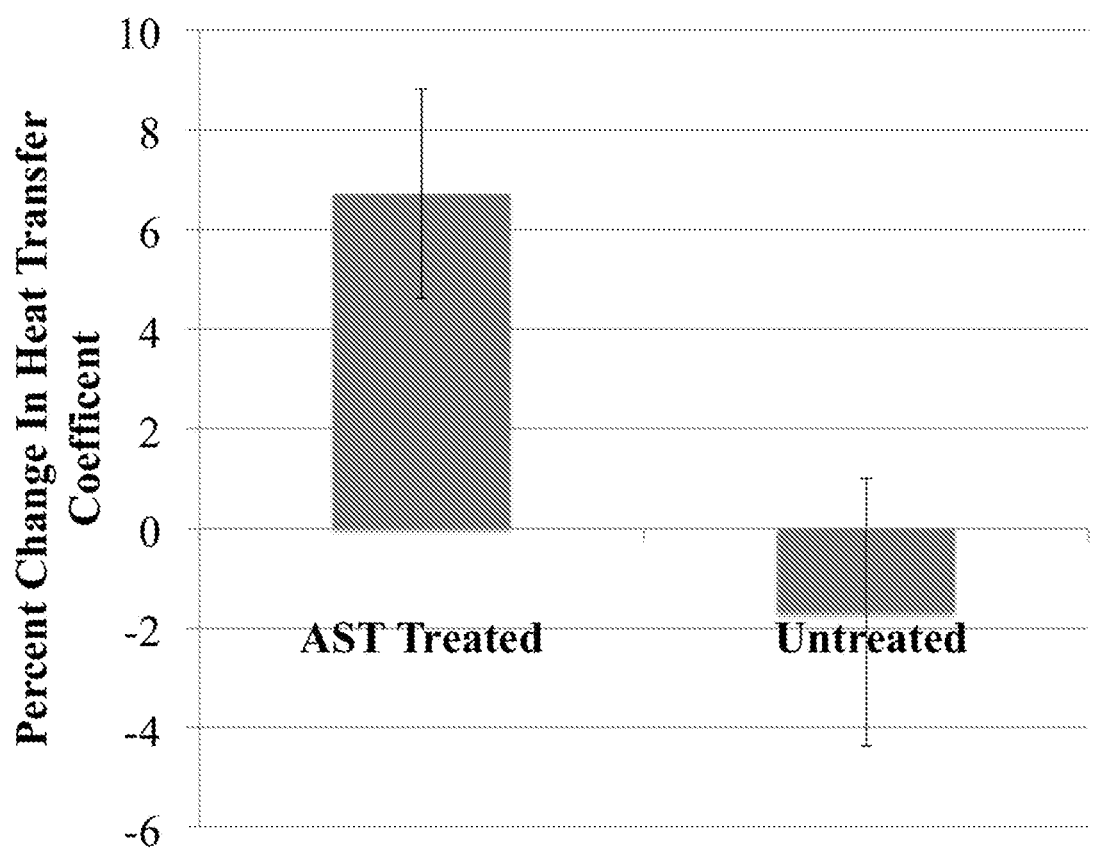
FIG. 8 is a plot showing the percentage change in heat transfer when a surface is treated in accordance with an embodiment of the invention.

Heat transfer: Using a custom flow loop, hot bath temperature control 701, and immersion heating element 702 shown in FIG. 7, the tubes were tested in a mock single-tube shell and tube heat exchanger 705. The tube was exposed to approximately 11° C. water from the cold bath 704 on the inner surface and approximately 50° C. water from the hot bath 703 on the outer surface at fluid velocities of approximately 6 feet per second. Temperature probes 706 at the inlet and outlet of the hot loops were used to record temperature changes across the tube. From this data the heat transfer coefficient was calculated. Pre and post coating heat transfer coefficient changes were compared for surfaces treated with TFEA/GPTES coating (AST Treated) and tubes that were not treated with the TFEA/GPTES coating. The percent change in heat transfer performance as a result of the TFEA/GPTES surface treatment, compared to an untreated tube, can be seen in the data presented in FIG. 8.

Example 2

Substrate Preparation: The heat exchanger to be treated will be disconnected from the flow system and drained. Commercial cleaning and descaling products may be used prior to the application of the treatment.

Reaction Solution: A 2,2,2-trifluoroethylamine hydrochloride (TFEA) solution of 1 kg/liter of water will be mixed until the TFEA is dissolved. Either A) (3-glycidyloxypropyl)triethoxysilane (GPTES) will be added to that solution in an amount of 2 liters per liter of TFEA solution, or B) (3-glycidyloxypropyl)trimethoxysilane (GPTMS) will be added to that solution in an amount of 1.6 liters per liter of TFEA solution. This solution will be stirred for 5 minutes.

Coating: The heat exchanger will be refilled with water using a closed loop system and cycled through the exchanger. To this flow loop, 1 liter of the above reaction solution will be added for every 1000 liters in the closed flow loop. The system will be allowed to circulate for approximately 30 minutes. The heat exchanger will then be drained and rinsed with fresh water.

Figure 9:
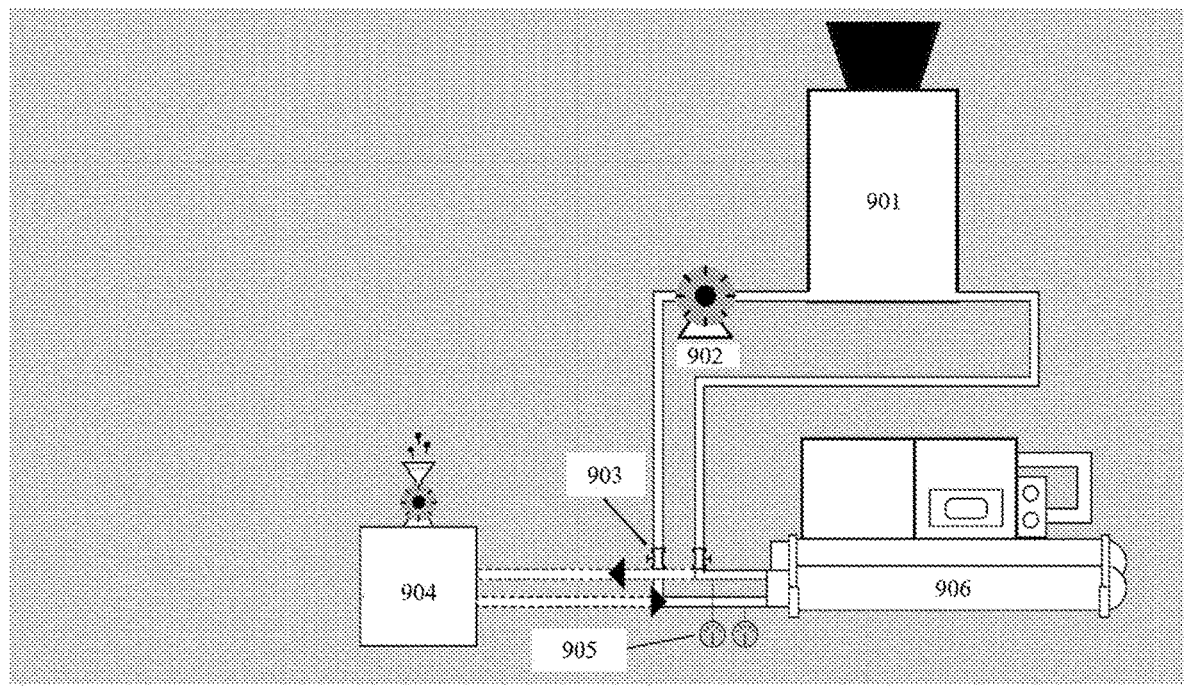
FIG. 9 is an illustration showing the treatment process for a heat exchanger on a chiller system, in accordance with an embodiment of the invention.

Operation: The heat exchanger will be allowed to air dry, or be dried by flowing hot air through the system following draining of the rinse solution. The heat exchanger will then be reconnected to its flow system and normal operation will continue. The treated heat exchanger is expected to display an improvement in heat transfer performance of five to ten percent to last for 6-24 months. In addition to the heat transfer improvements, the treated exchanger should exhibit a decrease in fouling buildup for a period of 6-24 months. An illustration of the treatment process for a heat exchanger on a chiller system is shown in FIG. 9. In this circumstance, the technology may be injected into the cooling tower 901 and circulated via a pump 902 through the chiller (condenser) 906. In certain conditions, the chiller 906 may be isolated using shut-off valves 903 and the technology in this case would be circulated via an mobile application apparatus 904. In either case, the impact on cooling efficiency can be measured by installed RTD temperature probes 905.

Example 3

Substrate Preparation: CuNi 70:30 Cleaned with Acetone

Reaction: In 1 Liter of distilled water, 1 mL of 3-(triethoxysilyl)propyl isocyanate was combined with 0.6 g of TFEA. This solution was in the flow coating rig shown in FIG. 6 with a section of CuNi tube to be treated inserted. The solution was allowed to react for 10 minutes while flowing to form an antibiofouling surface treatment (AST). The treatment solution was removed from the flow loop and fresh distilled water was added and the flow was started for another minute. Following this minute the water was drained from the system and the AST coated tube was allowed to air dry.

Figure 10:
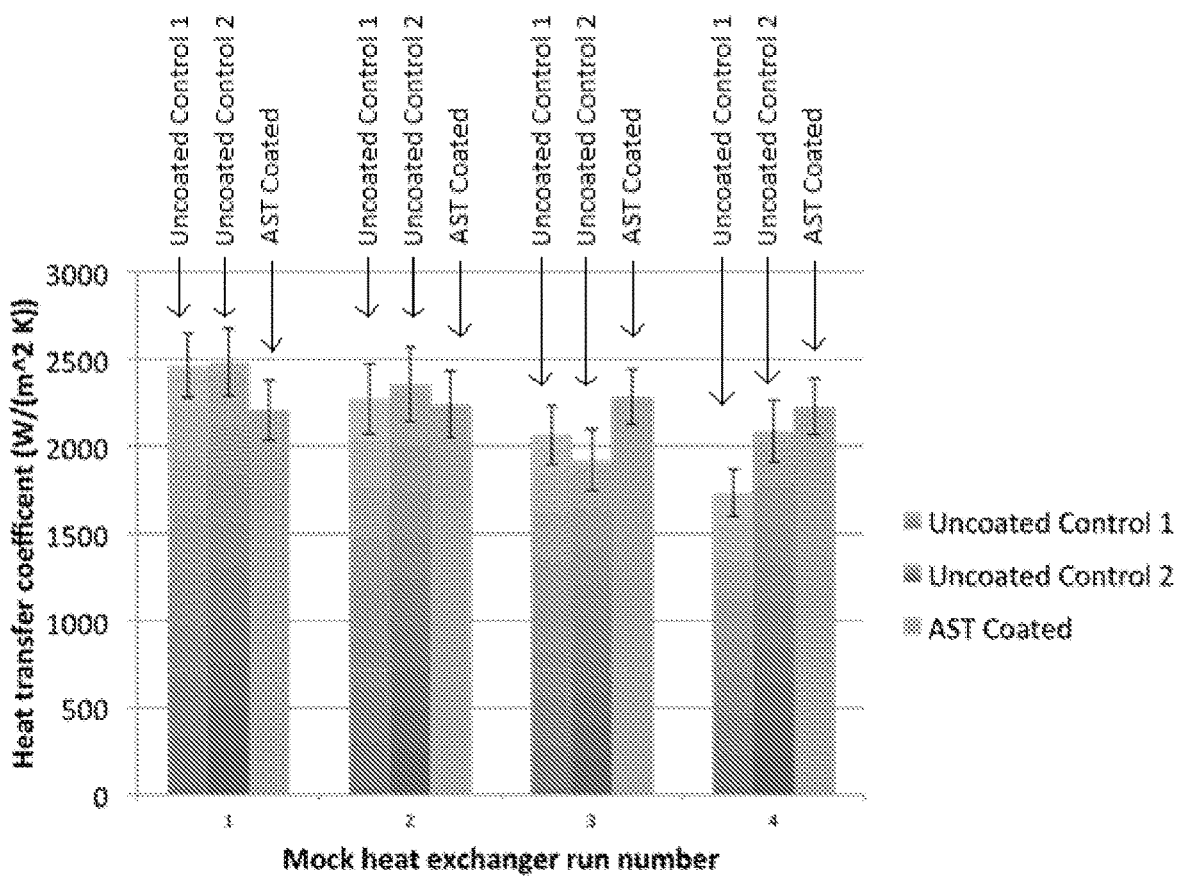
FIG. 10 is a plot showing the heat transfer coefficient of a surface in accordance with an embodiment of the invention, compared with control surfaces.

Heat transfer: Either the AST coated or the control CuNi tubes were placed in a single tube mock shell and tube heat exchanger. Water of 50° C. was flown on the shell side of the system and water of 11° C. was flown through the tube side (either the AST treated tube or the control tubes) for a total of 30 minutes. Inlet and outlet temperatures were recorded and heat transfer coefficient was calculated from the data. The heat transfer coefficient of the uncoated control 1, uncoated control 2, and the AST coated tube for each of four test runs is shown in FIG. 10.

Example 4

Substrate Preparation: 70:30 CuNi Tube Cleaned with Acetone

Reaction (1% Epoxide): 0.3 mL of GPTMS were combined with 0.3 g of TFEA in 30 mL of distilled water and mixed for 1 minute. A cleaned 70:30 CuNi tube sample was added to the solution and allowed to sit in the stirring solution for 5 minutes. Samples were rinsed via dipping in fresh distilled water and allowed to air dry overnight.

Reaction (1% pH Adjusted Epoxide): 0.3 mL of GPTMS were combined with 0.3 g of TFEA in 30 mL of distilled water adjusted to pH 4.5 with acetic acid and mixed for 1 minute. A cleaned 70:30 CuNi tube sample was added to the solution and allowed to sit in the stirring solution for 5 minutes. Samples were rinsed via dipping in fresh distilled water and allowed to air dry overnight.

Figure 11:
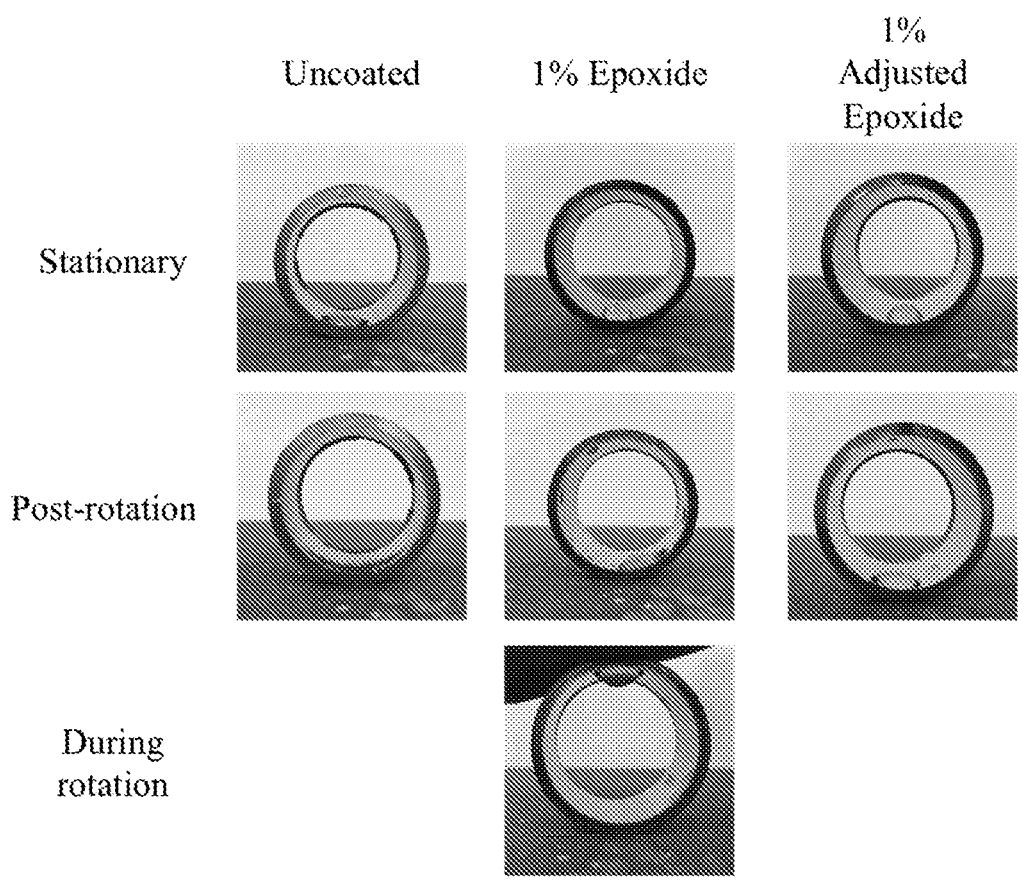
FIG. 11 is a photograph of a surface prepared in accordance with an embodiment of the invention.

The results are shown in FIG. 11.

Example 5

Substrate Preparation: Approximately two foot-long lengths of 1" outer diameter and 0.065" wall thickness CuNi tubing were cut and cleaned thoroughly with acetone.

Reaction Solution: 5 mL of isocyanate were combined with 1.04 g of TFEA in 5 mL of water and mixed for 5 minutes. This solution was then diluted to 50 mL of water and used for the coating step.

Coating: The pipe to be coated was sealed on one end. The reaction solution was poured into the pipe, the other end was also sealed, and the pipe was shaken and rocked for 1 to 2 min to distribute the coating solution throughout the surface of the pipe. The coating solution was then removed from the pipe and diluted to 500 mL of water and re-exposed to the surface for another minute. Following that the sample was rinsed with water. The same procedure was performed with the water as a rinse step. The pipe was then allowed to air dry overnight before placement in the biofouling chamber.

Figure 12:
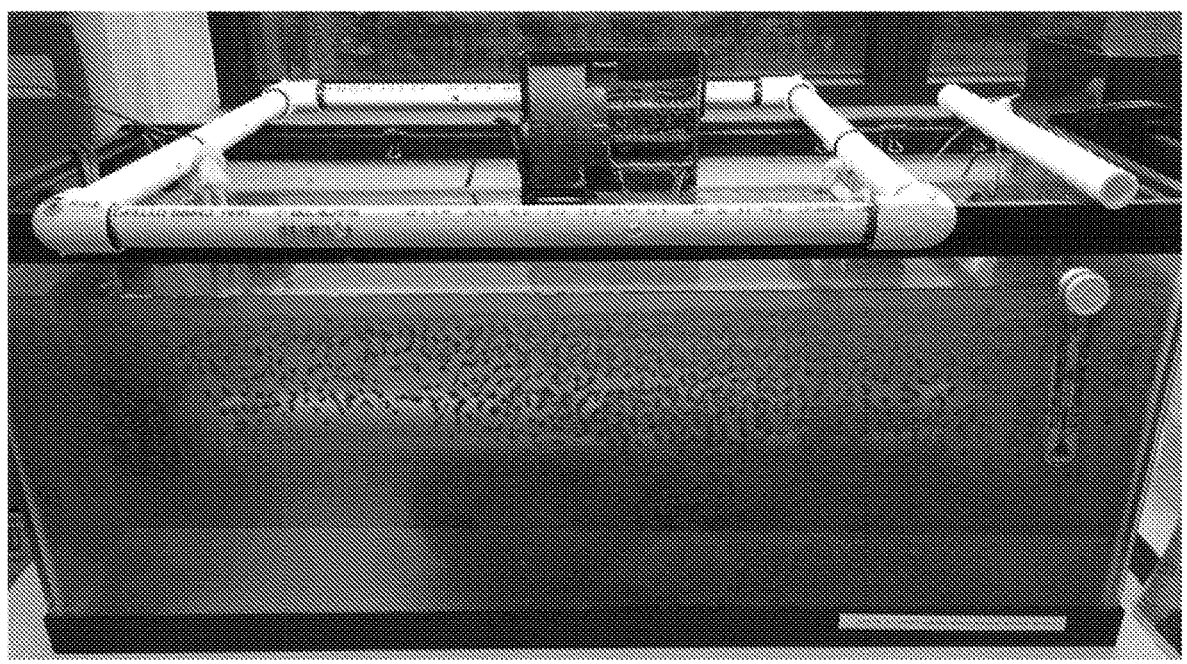
FIG. 12 is a photograph of a biofouling chamber experimental set-up.
Figure 13:
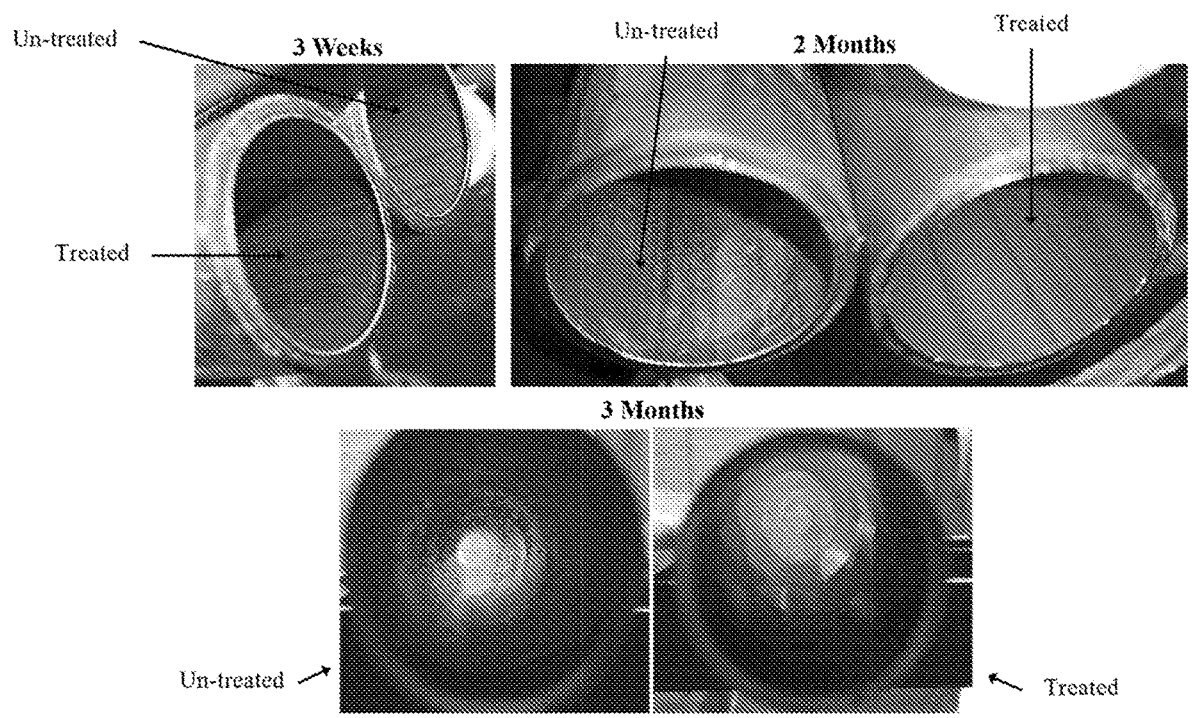
FIG. 13 is a photograph of a pipe with a surface treatment in accordance with an embodiment of the invention.

Operation: A treated and an untreated 70:30 copper nickel tube were placed in the freshwater biofouling chamber (shown in FIG. 12). At regular intervals for approximately 3 months the pipes were removed and evaluated for biofouling extent. At three weeks, two months, and three months, pictures were taken of the pipes to best show the state of biofouling at the current time point (shown in FIG. 13). As can be seen in the pictures, the biofouling did not occur on the treated tube but heavily occurred by three months on the untreated tube.

Example 6

Substrate Preparation: 1" by 2" coupons of 70:30 copper nickel were cleaned thoroughly with acetone. They were then exposed to flowing tap water for 24 hours.

Reaction: 0.5 g TFEA added to 0.5 mL distilled water and mixed until dissolved. 0.8 ml GPTMS was added to the stirring solution drop wise. The mixture was allowed to react for 1 minute with stirring.

Figure 6:
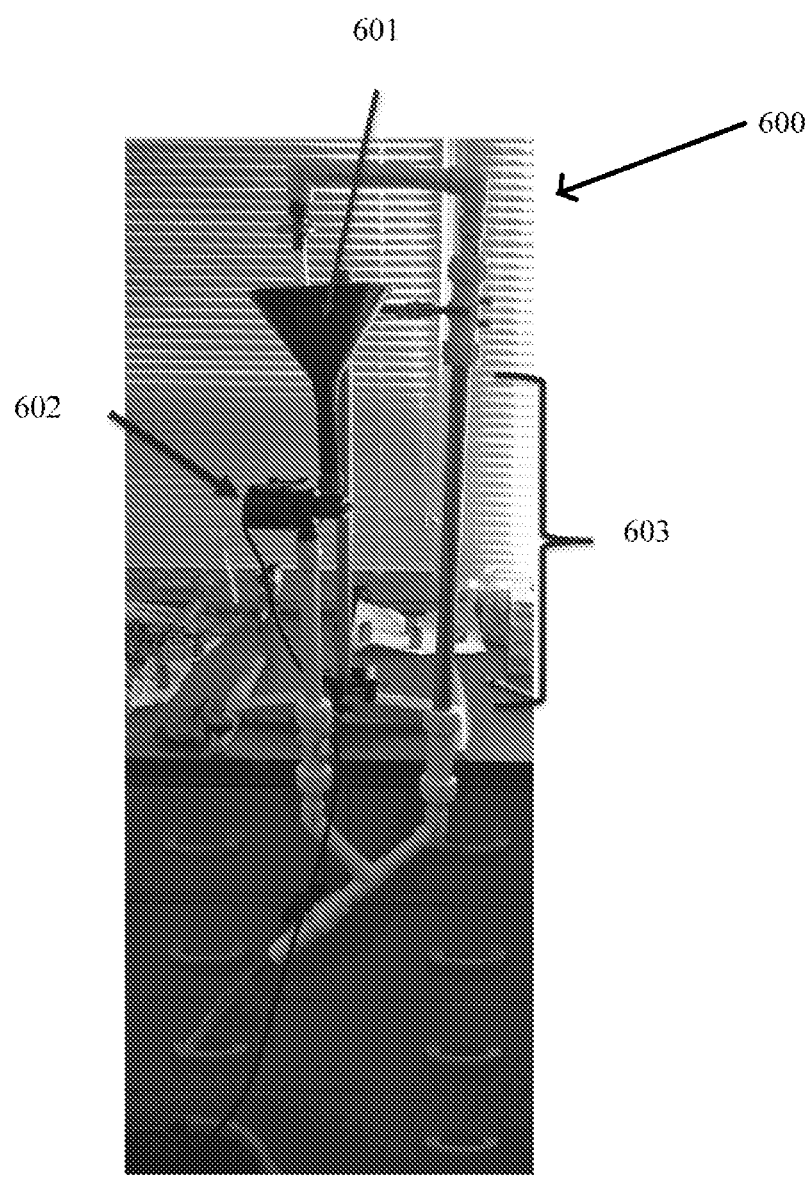
FIG. 6 is a photograph of a reaction apparatus used in accordance with an embodiment of the invention.
Figure 14A:
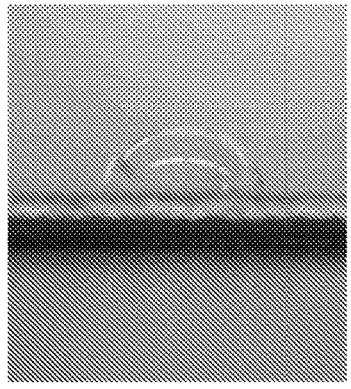
FIGS. 14A-C are photographs of coupons treated in accordance with an embodiment of the invention.
Figure 14B:
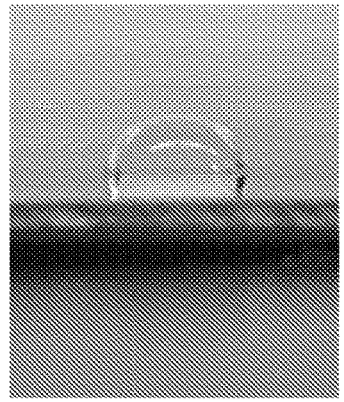
Figure 14C:
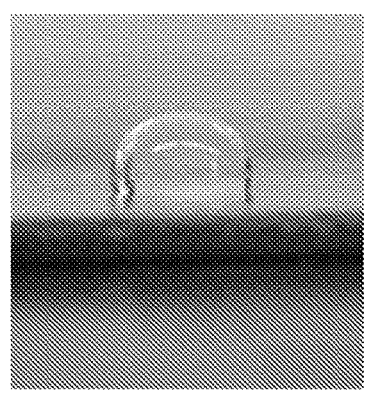

Coating: The coupons were placed in a funnel reservoir above the pump as shown in FIG. 6. The entirety of the reaction solution was added to a flow loop of distilled water totaling 1 liter. This loop was operated at a flow rate of approximately 100 gallons per hour for a total of 10 minutes. The treatment solution was then removed from the loop and the loop was filled with fresh distilled water as a rinse step. The now treated coupons were removed from the flow loop and allowed to air dry. The results are shown in FIGS. 14A, 14B, and 14C.

Example 7

Substrate Preparation: ½" coupons of stainless steel were cut from pipes and cleaned with acetone. They were then exposed to tap water until a decrease in surface hydrophobicity was confirmed.

Reaction: 1.0 g octadecylamine (ODA) was dissolved in 100 mL distilled water. 2.5 mL of the ODA solution was added to 50 uL of GPTES and 12.5 uL TFEA; the mixture was allowed to react for 5 minutes with stirring.

Figure 15:
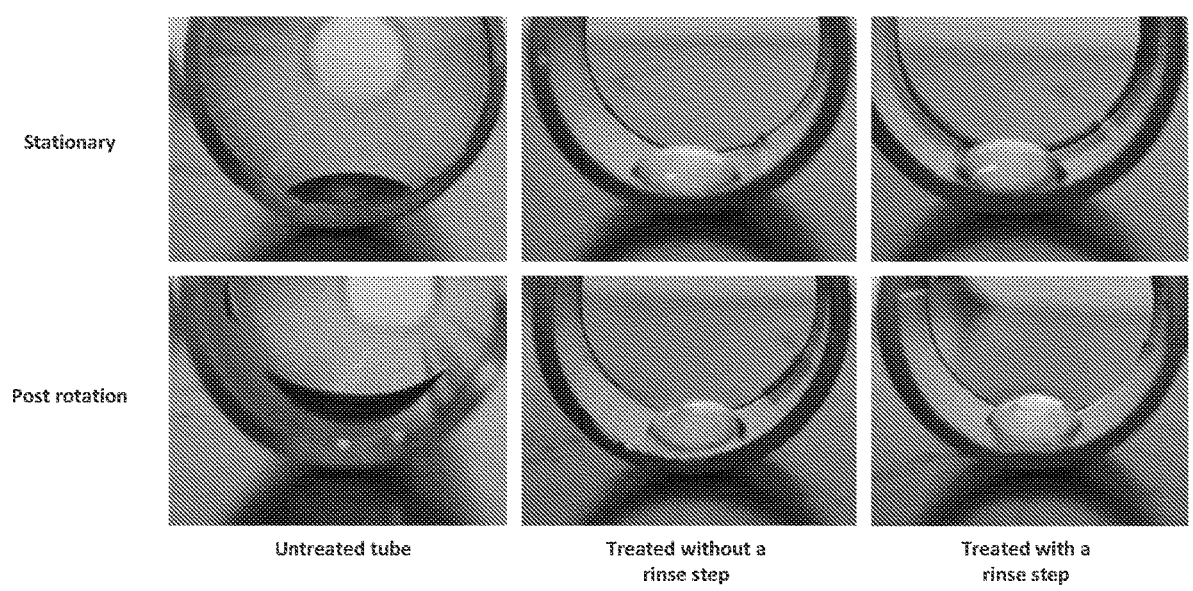
FIG. 15 is a photograph of a control pipe and of pipes treated in accordance with embodiments of the invention.

Coating: The entirety of the reaction solution was added to beaker of in total 50 mL distilled water containing the coupons and was vigorously stirred for 10 minutes. The coupons were then removed from the coating solution and dipped into a beaker of distilled water as a rinse step. They were then allowed to air dry overnight. The results are shown in FIG. 15.

Example 8

Substrate Preparation: Four 316L stainless steel tubes of 1" outer diameter and 0.05" wall thickness were cleaned with acetone to remove any oils from factory processing.

Reaction: 0.5 g TFEA added to 0.5 mL distilled water and mixed until dissolved. 1.0 mL GPTES was added to the stirring solution drop wise. The mixture was allowed to react for 5 minutes with stirring.

Coating: The entirety of the reaction solution was added to a flow loop of distilled water totaling one liter where a 2' portion of the loop consisted of a 316L stainless steel tube (described earlier). This loop was operated at a flow rate of approximately 100 gallons per hour for a total of 10 minutes. The treatment solution was then removed from the loop and the loop was filled with fresh distilled water as a rinse step. The now treated tube was removed from the flow loop and allowed to air dry.

Figure 16:
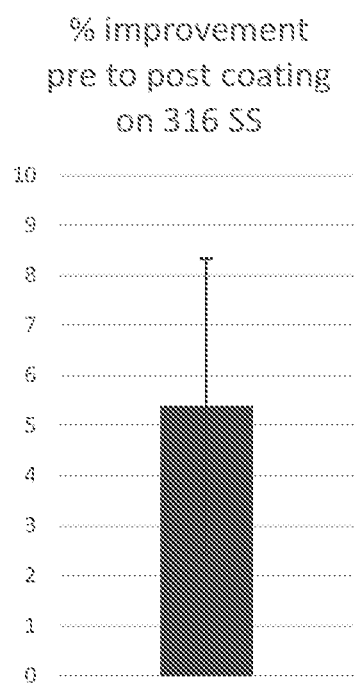
FIG. 16 is a plot showing percent change in heat transfer performance as a result of surface treatment in accordance with an embodiment of the invention.

Heat transfer: Using a custom flow loop and immersion heating element, the tubes were tested in a mock single-tube shell and tube heat exchanger. The tube was exposed to approximately 11° C. water on the inner surface and approximately 50° C. water on the outer surface at fluid velocities of approximately 6 feet per second. Temperature probes at the inlet and outlet of the hot loops were used to record temperature changes across the tube. From this data the heat transfer coefficient was calculated. Pre and post coating heat transfer coefficient changes were compared for four separate surfaces treated with the TFEA/GPTES solution (AST treated). The percent change in heat transfer performance as a result of the surface treatment, compared to the tube as measured before treatment, can be seen in the plot shown in FIG. 16.

Example 9

Substrate Preparation: The heat exchanger to be treated will be left online in full operation. No effort will be made to clean the substrate or alter surface chemistry in any way.

Reaction Solution: A TFEA solution of 1 kg/liter of water will be mixed until the TFEA is dissolved. Either A) GPTES will be added to that solution at 2 liters per liter of TFEA solution, or B) GPTMS will be added to that solution at 1.6 liters per liter of TFEA solution. This solution will be stirred for 5 minutes.

Coating: To the sump of the entire system, 1 liter of the above reaction solution will be added for every 1000 liters in the open cooling system loop. The system will be allowed to circulate in normal operation, with the components of the solution that do not attach to metal surfaces discharged slowly over days through the system blowdown.

Figure 17:
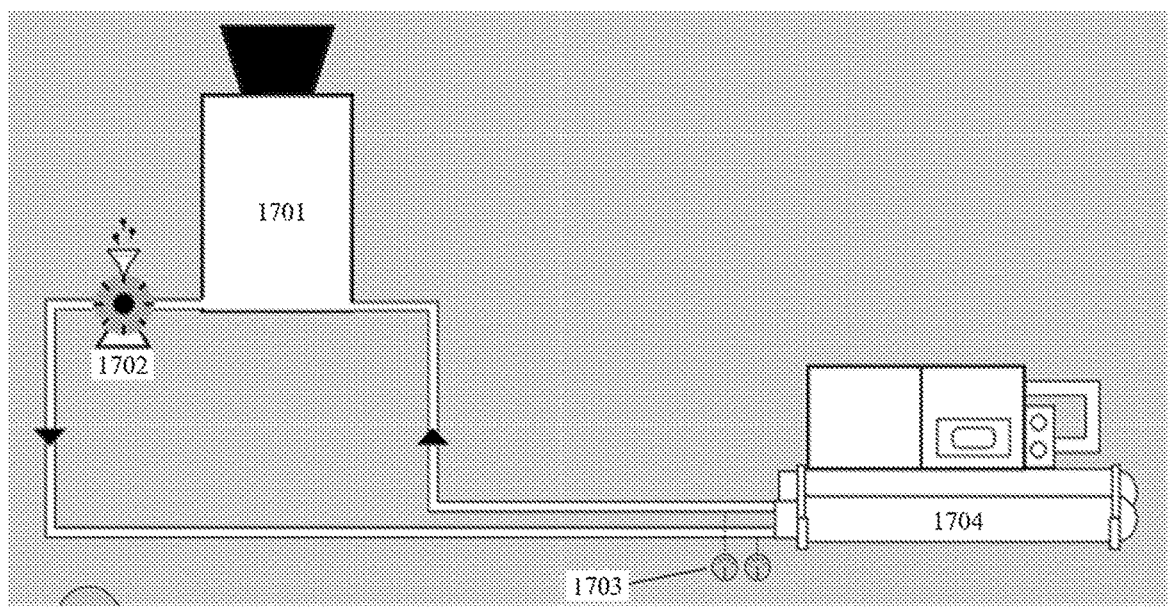
FIG. 17 is an illustration of a treatment process for a heat exchanger on a chiller system in accordance with an embodiment of the invention.

Operation: The heat on the opposite side of the chiller will facility the covalent linkage to internal surfaces. The treated heat exchanger will display an improvement in heat transfer performance of five to ten percent to last for 6-24 months. In addition to the heat transfer improvements, the treated exchanger should exhibit a decrease in fouling buildup for a period of 6-24 months. An illustration of the treatment process for a heat exchanger on a chiller system is shown in FIG. 17. In this case, the technology is injected at the sump of the cooling tower 1701 and circulated via a pump 1702 through the chiller (condenser) 1704. Improvements in the heat transfer efficiency are monitored using installed RTD temperature probes 1703.

Example 10

Figure 18:
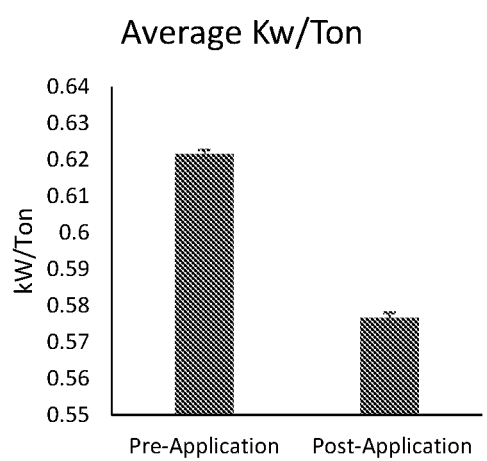
FIG. 18 is a graph showing the kW/Ton performance of a chiller without a surface treatment and the kW/Ton performance of the same chiller after application of a surface treatment in accordance with an embodiment of the invention.

System based application on an in-service closed loop cooling tower system providing chilled water to the condenser of building HVAC system. A solution of a halogenated alkyl alkoxy silane diluted in water was added to the system during operation by placing the solution in the sump of the cooling tower to reach a concentration of approximately 0.001% v/v in the cooling water. The three chillers attached to this cooling loop were operated for 2 two hours consecutively to facilitate treatment of the condensers on all three units. Due to seasonal operation only one of the chillers was operated during the testing period. Following treatment, the historic kilowatts energy required to generate a ton of cooling (kW/Ton) was compared historical operational data. It was found that data collected over 77 days following application showed a 7.3% decrease in kW/Ton compared to historical performance of the chiller, as shown in FIG. 18.

Example 11

Figure 19:
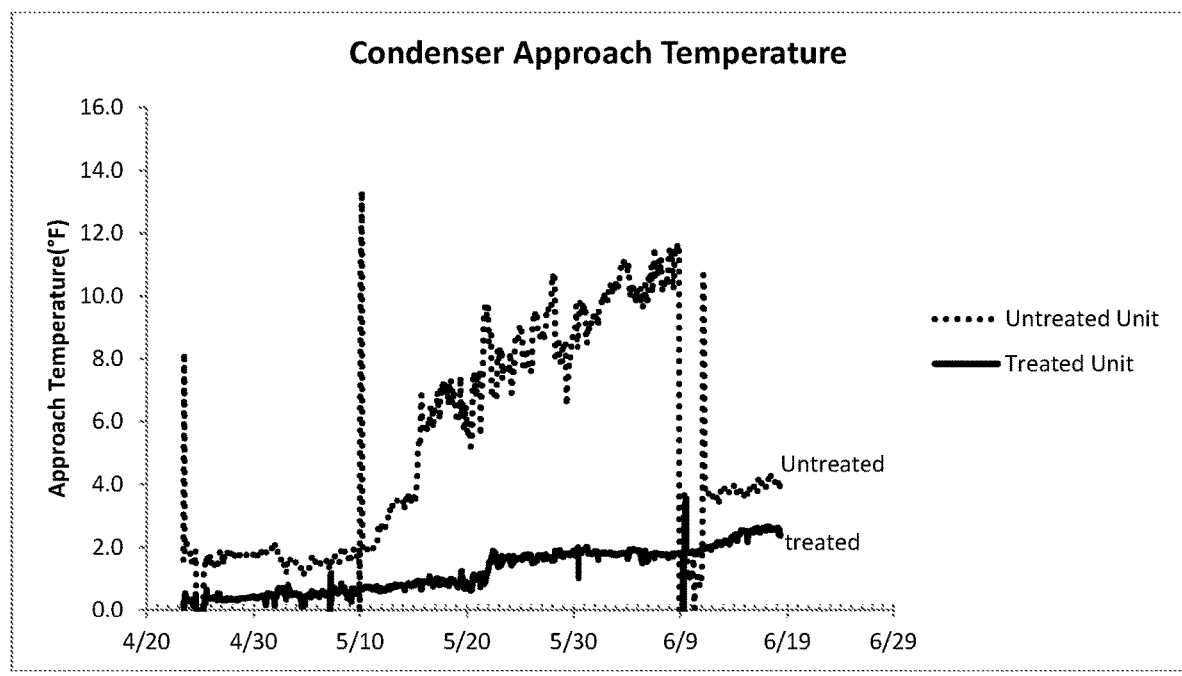
FIG. 19 is a plot comparing the approach temperature (° F.) over time (days) of a hydrogen cooler heat exchanger without a surface treatment and a hydrogen cooler heat exchanger with a surface treatment in accordance with an embodiment of the invention.

Component based application on an HVAC chiller side by side comparison. Two single pass chillers at a chilling plant were taken off line. The condensers on both chillers were cleaned with mechanical scrubbing. Following cleaning both condensers were filled with tap water. One condenser had a surface treatment of a solution of a halogenated alkyl alkoxy silane diluted in water applied by implementing a circulating pump connection to an inlet and outlet on the condenser. The surface treatment (a solution of a halogenated alkyl alkoxy silane diluted in water) was added to this circulating condenser system to a concentration of ~0.001% and circulation through the condenser was allowed to occur for 24 hours. Following circulation, the solution was allowed to sit in the treated condenser for a period of 72 hours due to facility schedule. The two chillers, control and treated, were then started at the same time and operated simultaneously at a similar load. During this time system approach temperature was monitored indicating the heat transfer properties of the treated condenser. These chillers utilized the same untreated fresh water source resulting in biological and silt fouling, which caused an increase in approach temperature as the heat transfer became more inefficient. FIG. 19 is a graph showing the approach temp performance of the treated and untreated chillers over the period of 54 days. It can be seen that the untreated chiller had dramatically greater increase in approach temperature over this time, so much so that the facility took the system off line and performed another mechanical cleaning. Despite the additional cleaning of the untreated unit, the treated unit continued to display a lower approach temperature than the untreated unit, indicating better transfer of heat from the condenser water to the HVAC refrigerant and indicating better performance.

Example 12

Figure 20:
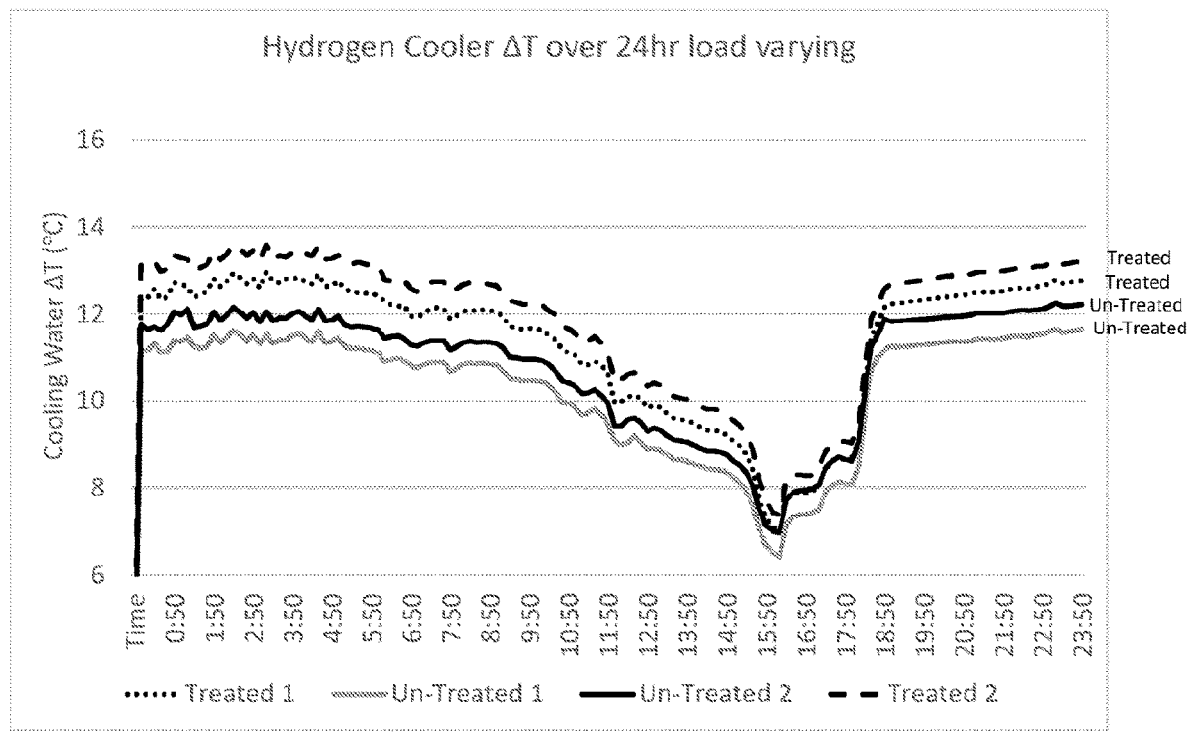
FIG. 20 is a plot comparing the temperature change (° C.) over time (hours:minutes) of a hydrogen cooler heat exchanger without a surface treatment and a hydrogen cooler heat exchanger with a surface treatment in accordance with an embodiment of the invention.

The hydrogen cooler heat exchangers utilized to cool the turbine of a coal fired power plant were treated. Two of the four hydrogen to cooling water heat exchangers were treated by flushing the inner tubes with a solution of a halogenated alkyl alkoxy silane diluted in water at a concentration of ~0.01% v/v in water for a total of 30 minutes. Following the treatment, the solution was removed and the heat exchangers were re-installed in the turbine housing. FIG. 20 is a 24 hour block of data displaying the temperature change of the cooling water as it passes through the heat exchanger. It can be seen that the two treated heat exchangers are displaying the greatest temperature change indicating improved performance compared to the untreated heat exchangers

What is claimed is:

1. A method of improving a heat transfer coefficient between an interior and an exterior of a fluid conduit, the method comprising acts of:
    applying a surface treatment to an internal surface of the fluid conduit to form a treated surface,
    wherein the surface treatment, after forming the treated surface on the internal surface of the fluid conduit, has a thickness of less than 1,000 nm,
    wherein the surface treatment includes a chemical structure of X—R—B, wherein X is a functional component, R is a branched or unbranched hydrocarbon, alkoxy, amine, or ether chain, and B is capable of at least one of hydrogen bonding and covalently linking with the internal surface of the fluid conduit to form the treated surface, and
    wherein the heat transfer coefficient for the fluid conduit having the treated surface is increased as compared to the heat transfer coefficient of the fluid conduit prior to the act of applying the surface treatment to the internal surface.

2. The method of claim 1, wherein applying the surface treatment to the internal surface comprises flowing the surface treatment through the fluid conduit.

3. The method of claim 1, wherein the surface treatment additionally provides one or more of:
    increased foul resistance, increased foul release, inhibition of corrosion, lowered surface energy, increased hydrophobicity, inhibition of scaling, and inhibition of fouling.

4. The method of claim 1, wherein the surface treatment includes water as a solvent.

5. The method of claim 4, wherein the surface treatment further includes acid.

6. The method of claim 1, wherein the surface treatment is applied by painting, spraying, misting, brushing, flowing, dipping, or otherwise contacting the surface treatment with the internal surface of the fluid conduit such that the surface treatment attaches to the internal surface of the fluid conduit to form a surface treatment layer.

7. The method of claim 1, wherein X, R, and B are combined with a solvent before or during application of the surface treatment, wherein the solvent is water.

8. The method of claim 1, wherein
X, R, and B are combined with a solvent before or during application of the surface treatment, and
the surface treatment self-assembles and attaches to the internal surface of the fluid conduit via at least one of hydrogen bonding and covalently linking.

* * * * *